United States Patent
Rau et al.

(10) Patent No.: US 11,980,955 B2
(45) Date of Patent: May 14, 2024

(54) CIRCULAR SAWS WITH LOCK ASSEMBLIES

(71) Applicant: Festool GmbH, Wendlingen am Neckar (DE)

(72) Inventors: Johannes Rau, Plochingen (DE); Tobias Hoefer, Urbach (DE)

(73) Assignee: Festool GmbH, Wendlingen am Neckar (DE)

( * ) Notice: Subject to any disclaimer, the term of this patent is extended or adjusted under 35 U.S.C. 154(b) by 0 days.

(21) Appl. No.: 17/919,612

(22) PCT Filed: Jun. 23, 2021

(86) PCT No.: PCT/EP2021/067120
§ 371 (c)(1),
(2) Date: Oct. 18, 2022

(87) PCT Pub. No.: WO2021/259987
PCT Pub. Date: Dec. 30, 2021

(65) Prior Publication Data
US 2023/0158586 A1 May 25, 2023

Related U.S. Application Data

(60) Provisional application No. 63/044,034, filed on Jun. 25, 2020.

(51) Int. Cl.
*B23D 47/02* (2006.01)
*B23D 47/12* (2006.01)
(Continued)

(52) U.S. Cl.
CPC ............. *B23D 47/12* (2013.01); *B23D 47/02* (2013.01); *B23D 59/003* (2013.01); *B27B 5/30* (2013.01);
(Continued)

(58) Field of Classification Search
CPC ........ B23D 47/12; B23D 5/32; B23D 59/003; B23D 47/02; B27B 9/04; B27B 9/02;
(Continued)

(56) References Cited

U.S. PATENT DOCUMENTS

| 3,971,906 A | 7/1976 | Sahrbacker |
| 3,973,179 A * | 8/1976 | Weber ................. H01M 50/204 200/332.2 |

(Continued)

FOREIGN PATENT DOCUMENTS

| EP | 981143 A2 | 2/2000 |
| EP | 1640118 A1 | 3/2006 |

(Continued)

OTHER PUBLICATIONS

International Search Report dated Sep. 15, 2021 from the corresponding PCT/EP2021/067120 (not prior art).

(Continued)

*Primary Examiner* — Ghassem Alie
(74) *Attorney, Agent, or Firm* — Lucian Wayne Beavers; Patterson Intellectual Property Law, PC

(57) ABSTRACT

Circular saws with lock assemblies are disclosed herein. The circular saws include a motor including a motor shaft configured to rotate about a shaft rotational axis. The circular saws also include an arbor configured to operatively attach a circular saw blade to the circular saw. The circular saws further include a switch configured to selectively apply an electric current to the motor and a switch lever configured to be selectively actuated, by a user of the circular saw and via an actuation force, to actuate the switch and direct the switch to apply the electric current to the motor. The lock assemblies include a switch lock, which defines a switch-locked configuration, in which the switch lock resists actuation of the switch lever by the user, and a switch-unlocked (Continued)

configuration, in which the switch lever is free to be actuated by the user.

17 Claims, 28 Drawing Sheets

(51) Int. Cl.
  *B23D 59/00* (2006.01)
  *B27B 5/30* (2006.01)
  *B27B 5/32* (2006.01)
  *B27B 9/02* (2006.01)
  *B27B 9/04* (2006.01)
  *B27G 19/04* (2006.01)
(52) U.S. Cl.
  CPC .................. *B27B 5/32* (2013.01); *B27B 9/02* (2013.01); *B27B 9/04* (2013.01); *B27G 19/04* (2013.01)
(58) Field of Classification Search
  CPC .......... B27B 5/30; B27G 19/04; H01H 13/08; H01H 3/20; H01H 9/06; H01H 9/282; H01H 9/28
  USPC ......... 30/388, 390, 391, 373, 286, 233, 520, 30/180, 122, 382; 83/478, 520, 860; 200/321, 43.17, 61.85, 505, 332, 293.1, 200/332.1, 332.2, 334, 318.1
  See application file for complete search history.

(56) References Cited

U.S. PATENT DOCUMENTS

| | | | | |
|---|---|---|---|---|
| 4,879,438 A * | 11/1989 | Winchester | .............. | H01H 9/06 310/50 |
| 8,752,646 B2 * | 6/2014 | Fujiwara | ................ | B24B 23/028 173/217 |
| 2010/0175972 A1 * | 7/2010 | Kimata | .................. | H01H 9/282 200/318.1 |

FOREIGN PATENT DOCUMENTS

| | | | | |
|---|---|---|---|---|
| EP | 2207191 A2 * | 7/2010 | .............. | H01H 9/28 |
| EP | 2881229 A2 | 6/2015 | | |
| GB | 2495204 A | 4/2013 | | |
| JP | 4269502 A2 | 9/1992 | | |
| JP | 2007030314 A | 2/2007 | | |
| JP | 2015182217 A | 10/2015 | | |

OTHER PUBLICATIONS

Japanese Office Action for patent application No. 2022-577545, dated Jan. 16, 2024, including English translation, 7 pages (not prior art).

* cited by examiner

CIRCULAR SAWS WITH LOCK ASSEMBLIES

RELATED APPLICATION

This application claims priority to U.S. Provisional Patent Application No. 63/044,034, which was filed on Jun. 25, 2020, and the complete disclosure of which is hereby incorporated by reference.

FIELD OF THE DISCLOSURE

The present disclosure is directed generally to circular saws that include lock assemblies.

BACKGROUND OF THE DISCLOSURE

Circular saws utilize a rotating circular saw blade to cut a workpiece. Circular saws may include a variety of safety, operational, and/or convenience features; however, there is demand for circular saws with improved safety, operational, and/or convenience features. Some circular saws may include conventional lock assemblies, which may, or may be utilized to, provide additional safety to a user of the circular saws, such as via selectively restricting and/or limiting rotation of the circular saw blade when such rotation might be dangerous and/or unadvised. While effective in certain circumstances, there exists an ongoing need for circular saws with improved lock assemblies.

SUMMARY OF THE DISCLOSURE

Circular saws with lock assemblies are disclosed herein. The circular saws include a motor including a motor shaft configured to rotate about a shaft rotational axis. The circular saws also include an arbor configured to operatively attach a circular saw blade to the circular saw and/or to receive a torque from the motor when the motor shaft rotates about the shaft rotational axis. The circular saws further include a switch configured to selectively apply an electric current to the motor and a switch lever configured to be selectively actuated, by a user of the circular saw and via an actuation force, to actuate the switch and direct the switch to apply the electric current to the motor. The lock assemblies also include a switch lock, which defines a switch-locked configuration, in which the switch lock resists actuation of the switch lever by the user, and a switch-unlocked configuration, in which the switch lever is free to be actuated by the user of the circular saw to actuate the switch assembly and thereby to apply the electric current to the motor.

In some examples, the switch lock further includes an off lock lever, which may be configured to be selectively actuated, by the user and via rotation about an off lock lever axis of rotation, to selectively transition the switch lock between the switch-locked configuration and the switch-unlocked configuration. The off lock lever may include an off lock lever stop, and the switch lever may include a switch lever stop. The switch lever stop may be configured to contact the off lock lever stop to resist motion of the switch lever when the off lock lever is in the switch-locked configuration. The switch lever may include a user engagement surface, which may be configured to receive the actuation force from the user. Upon receipt of the actuation force, the switch lever may be configured to operatively translate along a switch lever translation axis that may intersect the off lock lever axis of rotation. The user engagement surface and the switch lever stop may be at least partially on opposed sides of the switch lever translation axis.

In some examples, the switch lock may include a switch lock biasing mechanism, which may urge the switch lock toward the switch-locked configuration. In such examples, the lock assembly also may include an arbor lock. The arbor lock may define an arbor-locked configuration, in which the arbor lock resists rotation of the arbor about the shaft rotational axis, and an arbor unlocked-configuration, in which the arbor lock permits rotation of the arbor about the shaft rotational axis. The arbor lock also may include an arbor lock biasing mechanism that urges the arbor lock toward the arbor-locked configuration. The switch lock biasing mechanism may be spaced apart and/or distinct from the arbor lock biasing mechanism.

DETAILED DESCRIPTION AND BEST MODE OF THE DISCLOSURE

Figure 1:
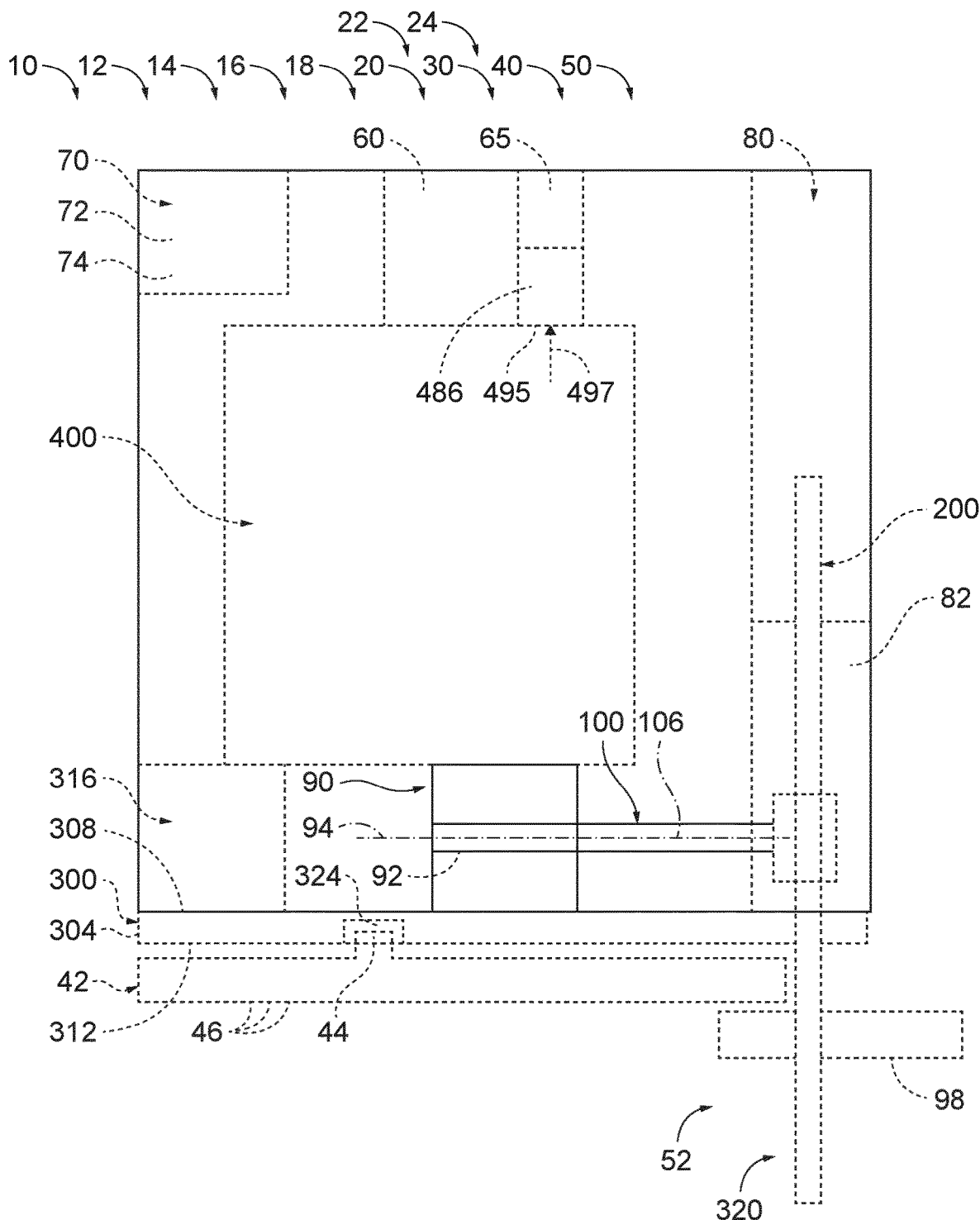
FIG. 1 is a schematic illustration of examples of a circular saw according to the present disclosure.

FIGS. 1-28 provide examples of circular saws 10 and/or components thereof, according to the present disclosure. Elements that serve a similar, or at least substantially similar, purpose are labeled with like numbers in each of FIGS. 1-28, and these elements may not be discussed in detail herein with reference to each of FIGS. 1-28. Similarly, all elements may not be labeled in each of FIGS. 1-28, but reference numerals associated therewith may be utilized herein for consistency. Elements, components, and/or features that are discussed herein with reference to one or more of FIGS. 1-28 may be included in and/or utilized with any of FIGS. 1-28 without departing from the scope of the present disclosure.

In general, elements that are likely to be included in a particular embodiment are illustrated in solid lines, while elements that are optional are illustrated in dashed lines. However, elements that are shown in solid lines may not be essential to all embodiments and, in some embodiments, may be omitted without departing from the scope of the present disclosure.

Figure 2:
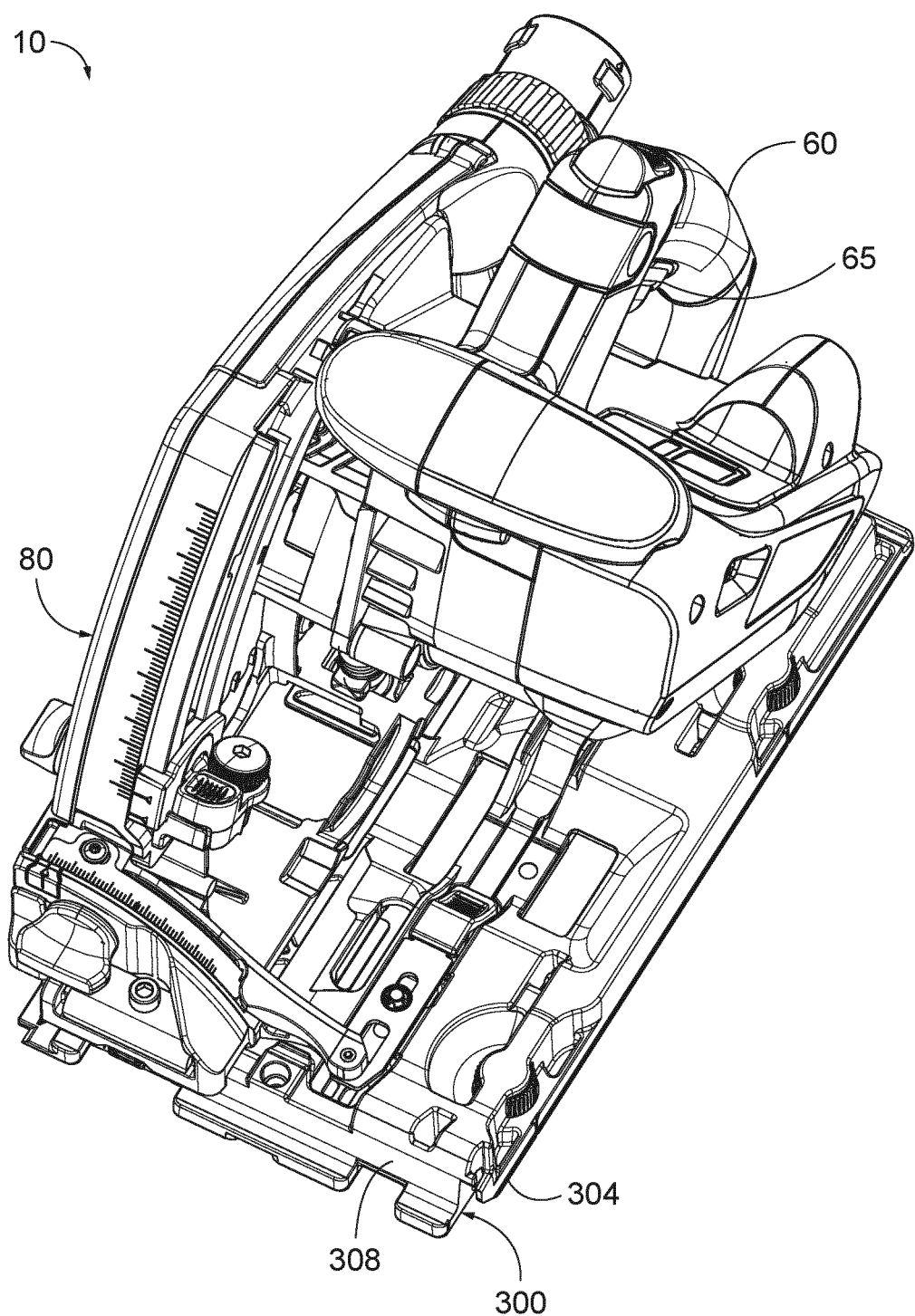
FIG. 2 is a less schematic top profile view of an example of a circular saw according to the present disclosure.
Figure 3:
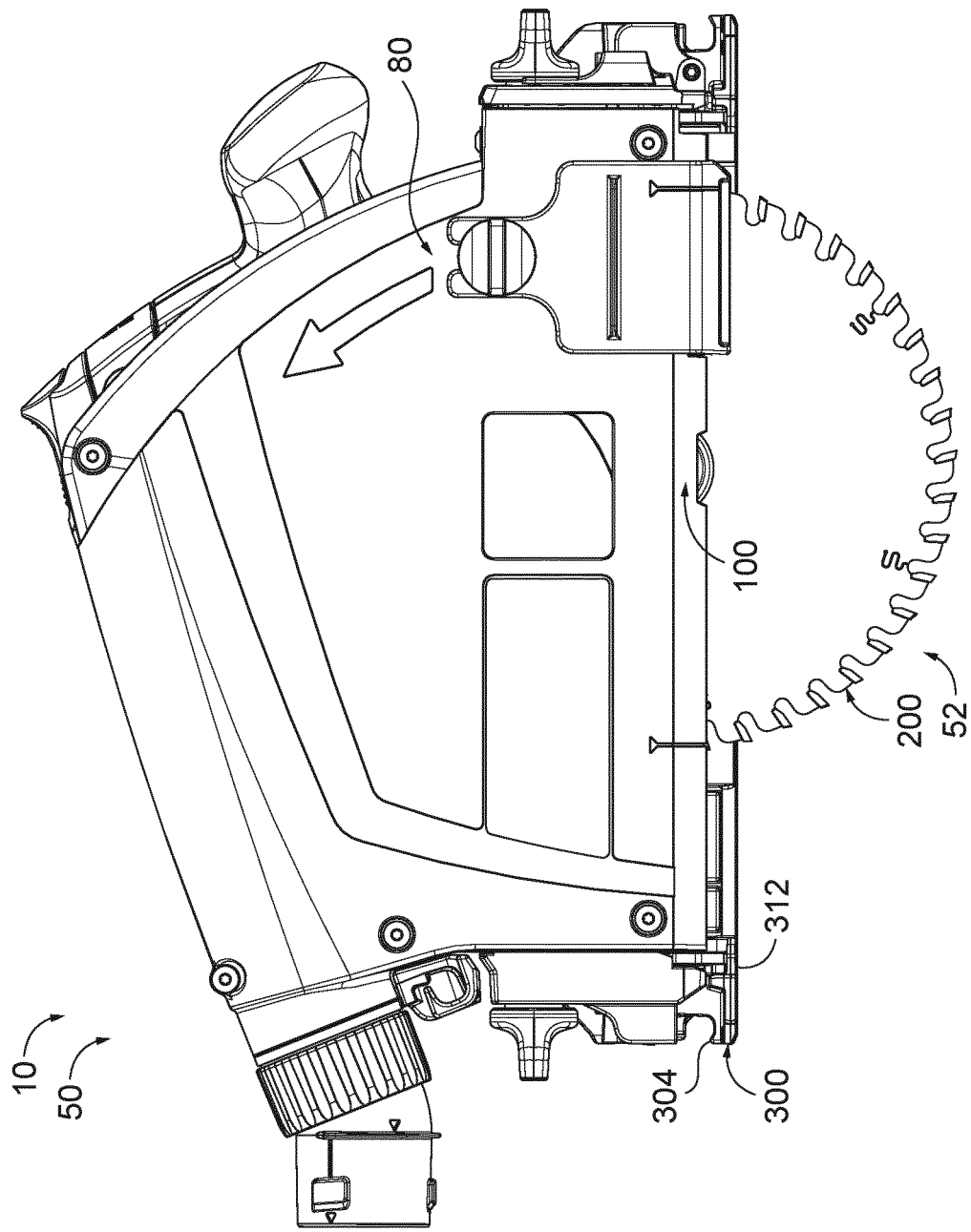
FIG. 3 is a less schematic right side view of an example of a circular saw according to the present disclosure.
Figure 4:
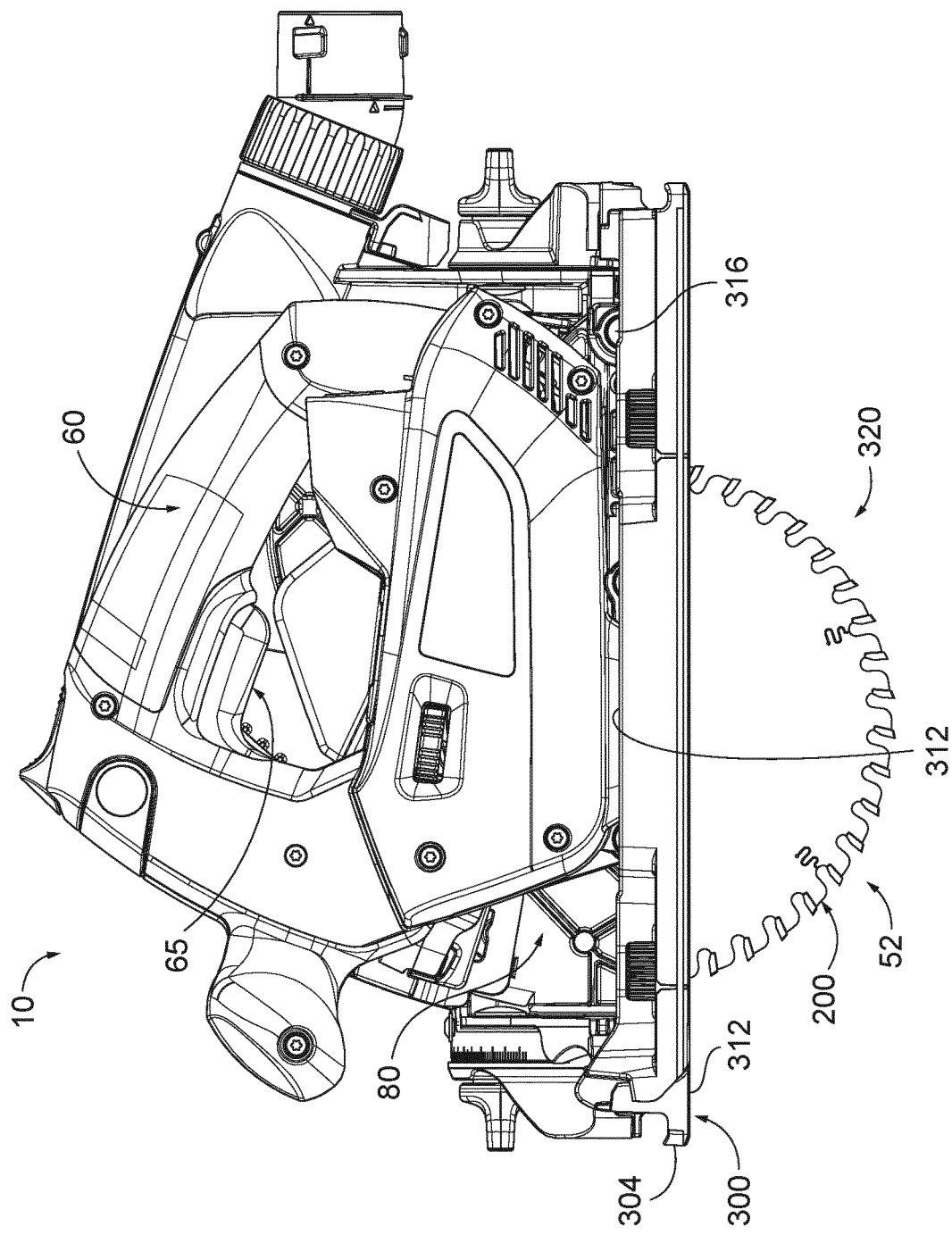
FIG. 4 is a less schematic left side view of an example of a circular saw according to the present disclosure.
Figure 5:
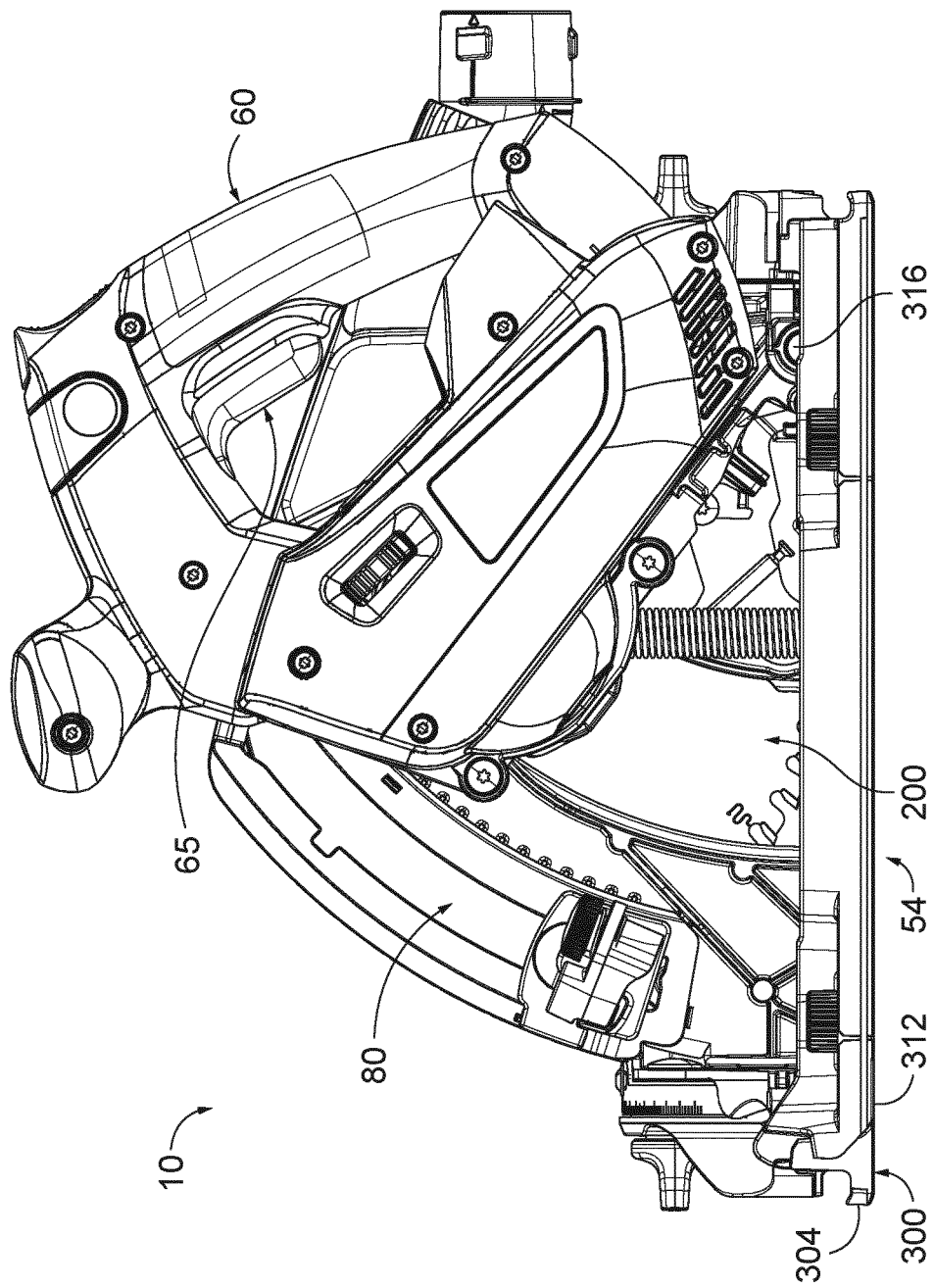
FIG. 5 is another less schematic left side view of an example of a circular saw according to the present disclosure.
Figure 6:
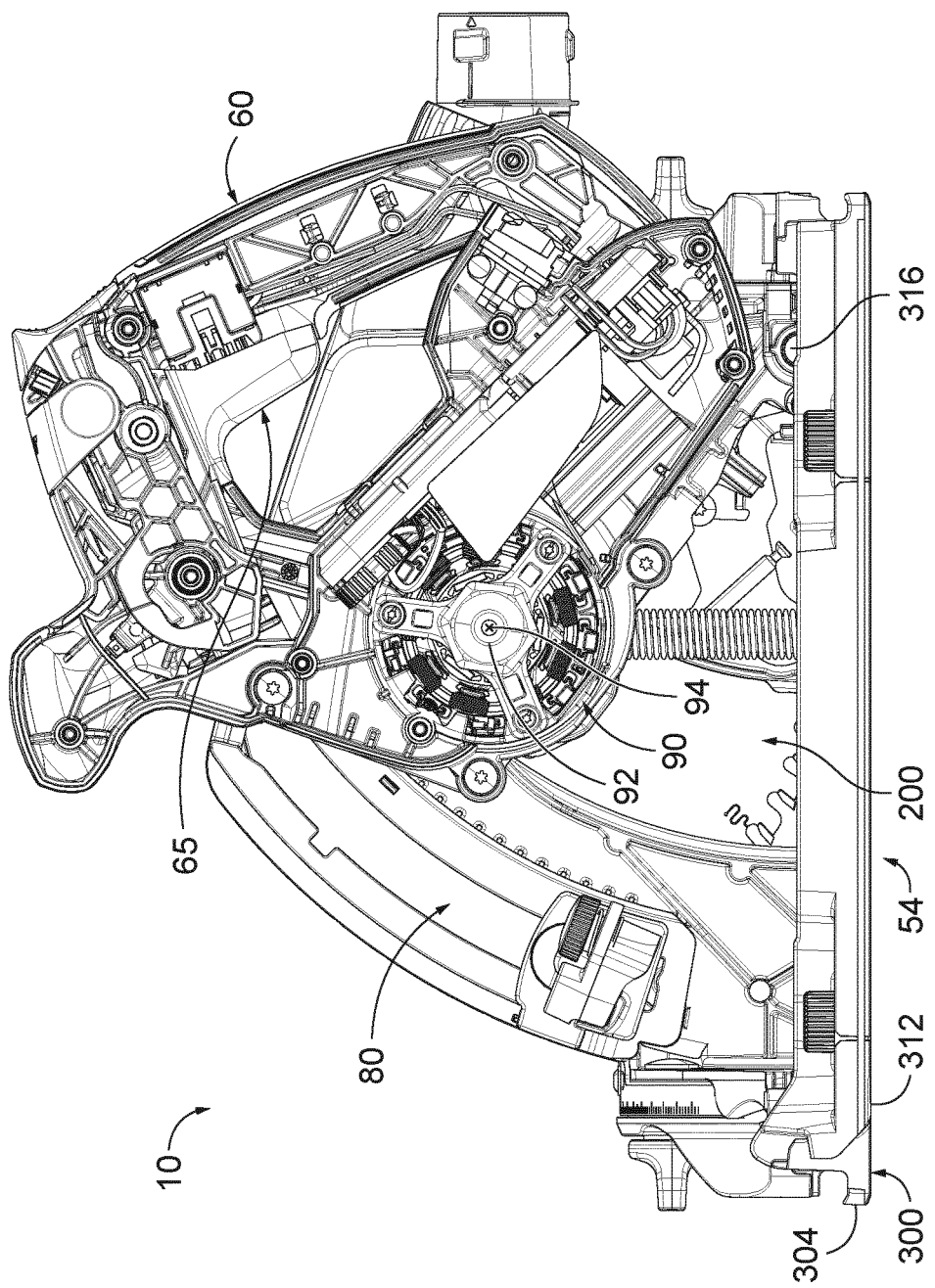
FIG. 6 is another less schematic left side view of an example of a circular saw according to the present disclosure.
Figure 7:
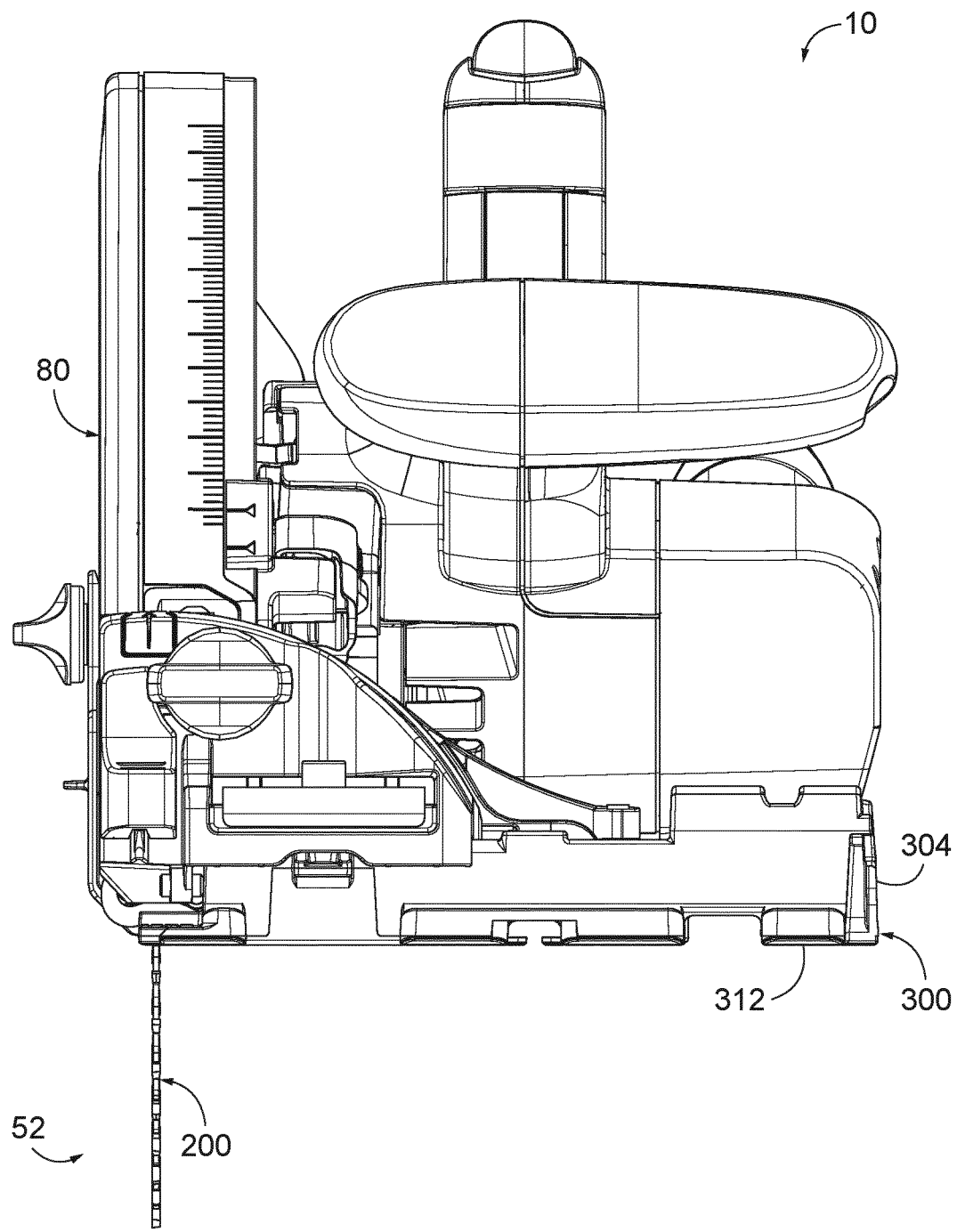
FIG. 7 is a less schematic front view of an example of a circular saw according to the present disclosure.
Figure 8:
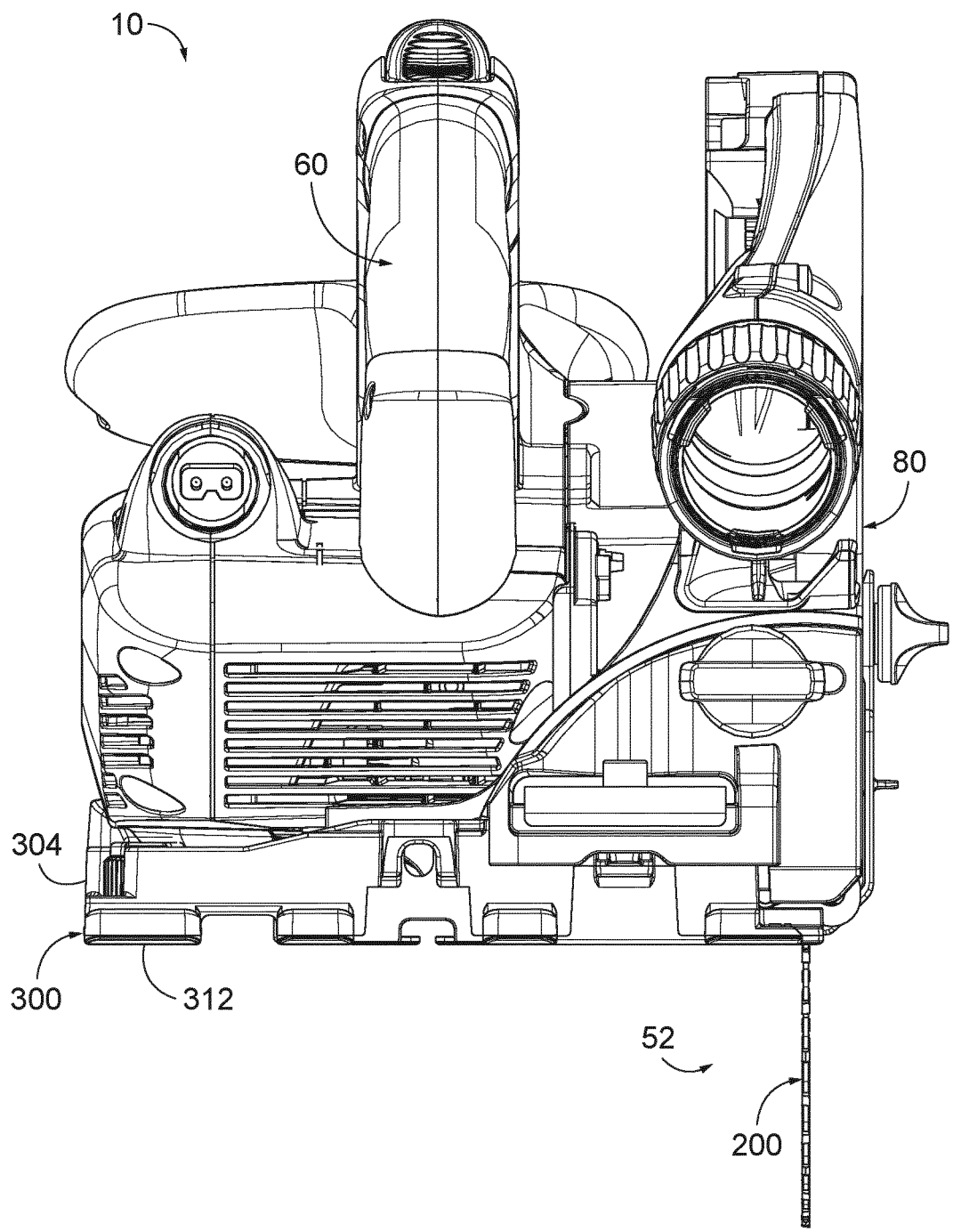
FIG. 8 is a less schematic rear view of an example of a circular saw according to the present disclosure.
Figure 9:
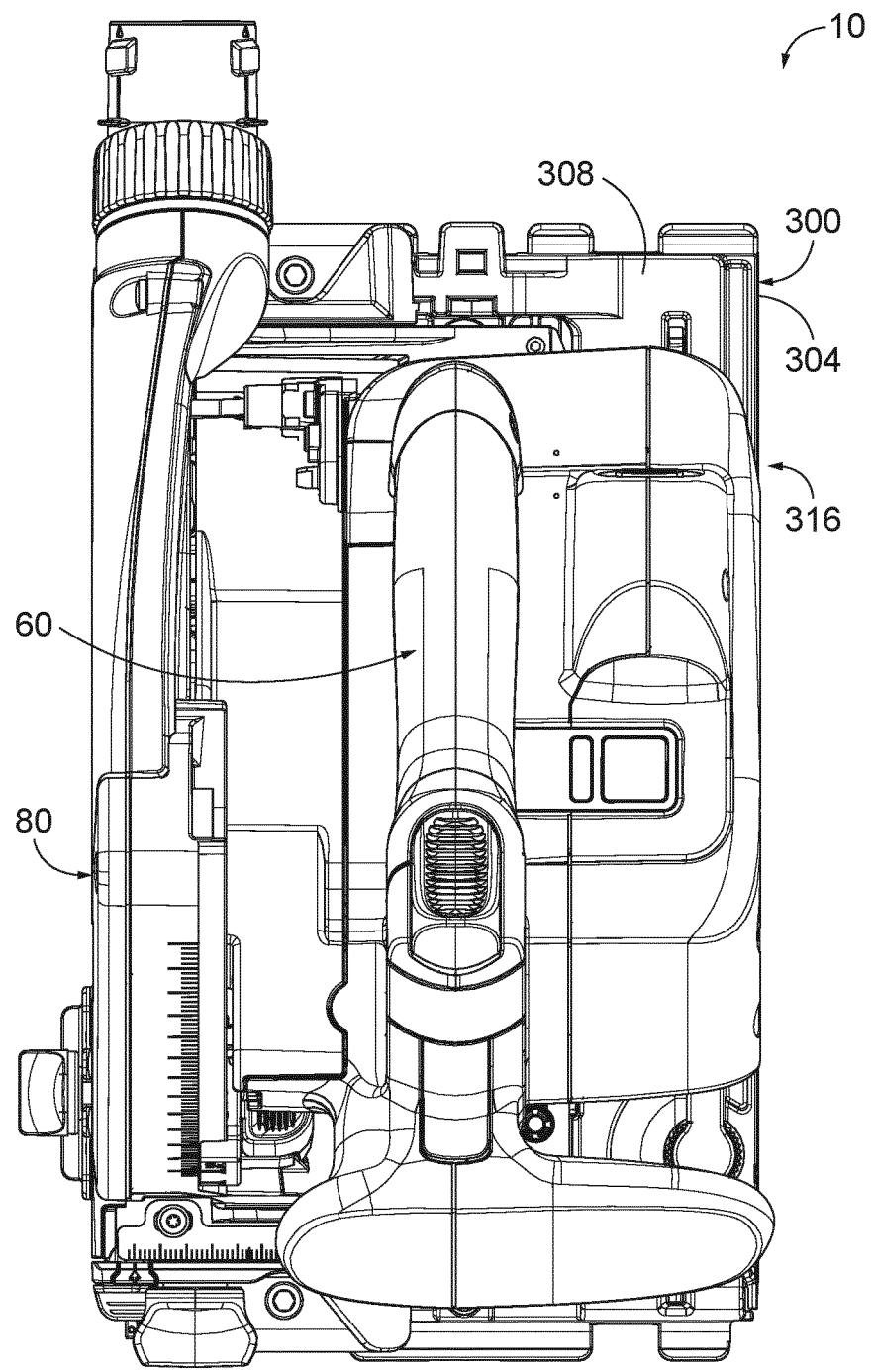
FIG. 9 is a less schematic top view of an example of a circular saw according to the present disclosure.
Figure 10:
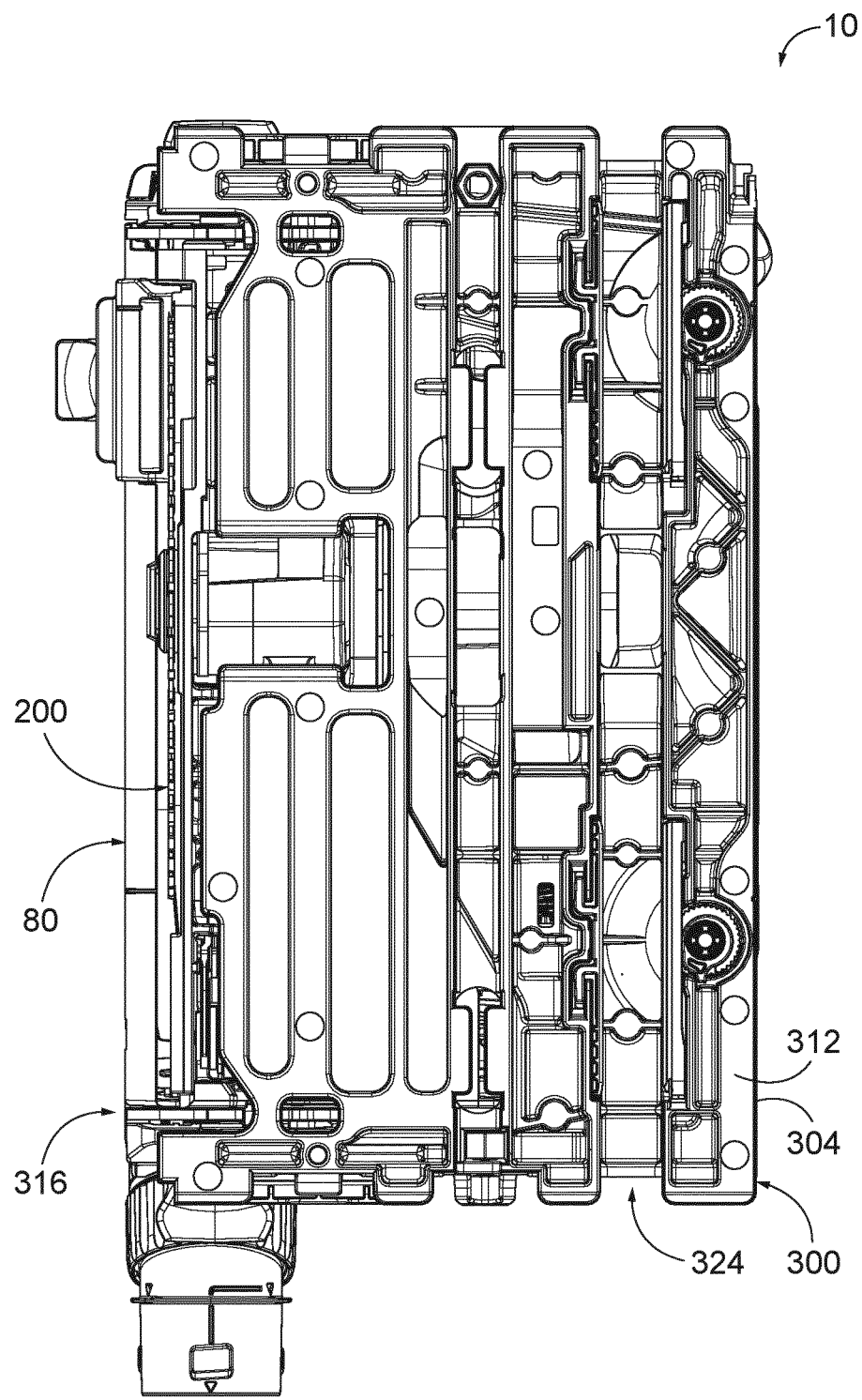
FIG. 10 is a less schematic bottom view of an example of a circular saw according to the present disclosure.

FIG. 1 is a schematic illustration of examples of circular saws 10 according to the present disclosure, while FIGS. 2-10 are less schematic illustrations of an example of a circular saw 10 according to the present disclosure. More specifically, FIG. 2 illustrates a top profile view of circular saw 10, and FIG. 3 illustrates a right side view of circular saw 10. FIG. 4 illustrates a left side view of circular saw 10 illustrating the circular saw in a fully plunged orientation 52, FIG. 5 illustrates the left side view of circular saw 10 illustrating the circular saw in a fully retracted orientation 54, and FIG. 6 illustrates the left side view of FIG. 5 with several covers removed. FIG. 7 is a front view of circular saw 10, FIG. 8 is a rear view of circular saw 10, FIG. 9 is a top view of circular saw 10, and FIG. 10 is a bottom view of circular saw 10.

As illustrated collectively by FIGS. 1-10, circular saws 10 include a motor 90 that includes a motor shaft 92 configured to rotate about a shaft axis of rotation 94. Circular saws 10 also include an arbor 100 configured to receive a torque from motor 90 when motor shaft 92 rotates about the shaft rotational axis. As illustrated in dashed lines in FIG. 1 and in solid lines in FIGS. 3-8 and 10, circular saws 10 also may include a circular saw blade 200. Circular saw blade 200, when present, may be operatively attached to the circular saw via arbor 100 and/or may be configured for rotational movement with the arbor. Rotation of circular saw blade 200 may facilitate cutting of a workpiece 98 with the circular saw blade, as schematically illustrated in FIG. 1.

Circular saws 10 may include any suitable type or style of circular saw that is adapted, configured, designed, and/or constructed to utilize a circular saw blade 200 to cut the workpiece. Examples of circular saws 10 include a handheld circular saw 12, a miter saw 14, a radial arm saw 16, a table saw 18, a chop saw 20, an upcut saw 22, a panel saw 24, a plunge saw 30, a track saw 40, and/or a bevel saw 50, as schematically illustrated in FIG. 1. In some examples, circular saws 10 may include structures and/or features from two or more of the above saws, and/or may incorporate functionality of two or more of the above saws. As an example, and as discussed in more detail herein, a given circular saw 10 may be and/or may incorporate functionality of handheld circular saw 12, plunge saw 30, track saw 40, and/or bevel saw 50. Circular saws 10 according to the present disclosure thus may include one or more of the features disclosed herein, but circular saws 10 are not required to include all of the features disclosed herein.

Motor 90 may include any suitable structure that may provide the motive force for rotation of motor shaft 92 and/or for actuation of circular saw blade 200. Examples of motor 90 include an electric motor, an AC electric motor, a DC electric motor, a brushless DC motor, a variable-speed motor, and/or a single-speed motor.

As illustrated in dashed lines in FIG. 1 and in solid lines in FIGS. 2, 4-6, and 8-9, circular saws 10 may include a gripping region 60 that is configured to be gripped and/or held by a user during operation of the circular saw. Gripping region 60, when present, also may be referred to herein as and/or may be a handle, or hand grip.

As also illustrated in dashed lines in FIG. 1 and in solid lines in FIGS. 2 and 4-6, circular saws 10 may include at least one switch 65. Switch(es) 65, when present, may be configured to be selectively actuated by the user of the circular saw, such as to enable and/or permit electric current to be provided to at least one other component of the circular saw and/or to permit powered operation of the at least one other component of the circular saw. As examples, selective actuation of switch(es) 65 may be utilized to enable operation of a motor controller of the circular saw, to selectively apply an electric current to motor 90, to enable the motor controller to selectively apply the electric current to the motor, and/or to permit, or direct, the motor to provide the motive force for rotation of the motor shaft. In some examples, the electric current may be utilized to power, or to directly power, at least one other component of the circular saw, such as motor 90. In some such examples, the electric current also may be referred to herein as an electric power signal. In some examples, the electric current may be an electric data signal that is sent to at least one other component of the circular saw, such as the motor controller of the circular saw. In some such examples, the electric current also may be referred to herein as a data signal and/or as an electric data signal. Examples of switch 65 include an electrical switch, a normally open electrical switch, a momentary electrical switch, and/or a locking momentary electrical switch.

In some examples, circular saws 10 also may include a switch lever 486. Switch lever 486 may be configured to be selectively actuated by the user of the circular saw, via application of an actuation force 497, to actuate switch 65 and/or to direct the switch to apply the electric current to the motor. Stated another way, the user may interact with, or apply the actuation force to, switch lever 486, and switch lever 486 may interact with, or actuate, switch 65.

As also illustrated in dashed lines in FIG. 1 and in solid lines in FIGS. 2-10, circular saws 10 may include a workpiece support 300. Workpiece support 300, when present, may be configured to support workpiece 98 and/or to position the circular saw relative to the workpiece when the workpiece is cut or otherwise acted upon by the implement. For example, many circular saws 10 in the form of saws include workpiece support 300 in the form of a base plate, table, shoe, rack, or pad.

Circular saws 10 may include any suitable power source, and corresponding power structures, for powering motor 90, for electrically powering the circular saw, and/or for providing electric current to the circular saw. Examples of the power structures include a power supply structure 70, such as a power cord 72 and/or a battery 74, as illustrated in FIG. 1.

As also illustrated in dashed lines in FIG. 1 and in solid lines in FIGS. 2-10, circular saws 10 may include a blade guard 80. Blade guard 80, when present, may be configured to cover, to house, and/or to contain at least a region of circular saw blade 200, such as to prevent, or to decrease a potential for, contact between the user and the circular saw blade. In some examples of circular saws 10, blade guard 80 may include a retractable region 82, as illustrated in FIG. 1. The retractable region may be configured to fold, rotate, and/or otherwise retract when the circular saw is utilized to cut the workpiece. Retractable region 82 additionally or alternatively may be referred to as a retracting region 82 and/or a collapsing region 82.

In some examples, and as discussed, circular saws 10 may include and/or be plunge saw 30. In examples of circular saws 10 that are or include a plunge saw 30, arbor 100 may be configured to move relative to workpiece support 300, such as to selectively vary a region of circular saw blade 200 that projects from the workpiece support and/or to selectively vary a depth-of-cut of the circular saw. For example, arbor 100 may be configured to pivot relative to workpiece support 300, as illustrated by the transition from a fully plunged orientation 52, as illustrated in FIGS. 3-4 and 7-8, and a fully retracted orientation 54, as illustrated in FIGS. 5-6.

As a specific example, workpiece support 300 may include and/or be a base plate 304 that defines an arbor-facing side 308 and an arbor-opposed side 312. Arbor 100 may be operatively attached to arbor-facing side 308 of workpiece support 300 with, via, and/or utilizing a workpiece support pivot 316. In such examples, arbor 100 and workpiece support 300 may be configured to rotate, relative to one another, about workpiece support pivot 316, such as to selectively vary a region 320 of circular saw blade 200 that extends on arbor-opposed side 312 of the workpiece support, as perhaps best illustrated by the transition from the configuration that is illustrated in FIG. 4, which illustrates fully plunged orientation 52, to the configuration that is illustrated in FIG. 5, which illustrates fully retracted orientation 54.

Stated another way, arbor 100 may be configured to pivot relative to workpiece support 300 throughout a range of relative orientations, or relative angles, that may be bounded by the fully plunged orientation and the fully retracted orientation. For each relative orientation in this range of relative orientations, circular saw blade 200 may extend on arbor-opposed side 312 by a corresponding amount, thereby providing a corresponding maximum depth-of-cut for the circular saw.

In some examples, and as discussed, circular saws 10 may include and/or be track saw 40. In examples of circular saws 10 that are or include a track saw 40, workpiece support 300 and/or base plate 304 may include a rib-receiving channel 324, which may be configured to receive a raised elongate rib 44 of a track 42, as perhaps best illustrated in FIG. 1. Track 42 also may be referred to herein as an elongate track 42 and may be formed from one or more elongate track segments, or track sections, 46, which may be operatively attached to one another to define any suitable track length. During operation of track saws 40, track 42 may be operatively attached, or clamped, to workpiece 98 such that an edge of the track corresponds to a desired cut line for the track saw. Subsequently, the track saw may be positioned, relative to the track, such that raised elongate rib 44 is positioned within rib-receiving channel 324; and the track saw then may be translated along at least a fraction of the length of the elongate track, thereby producing a straight cut along the desired cut line.

Figure 11:
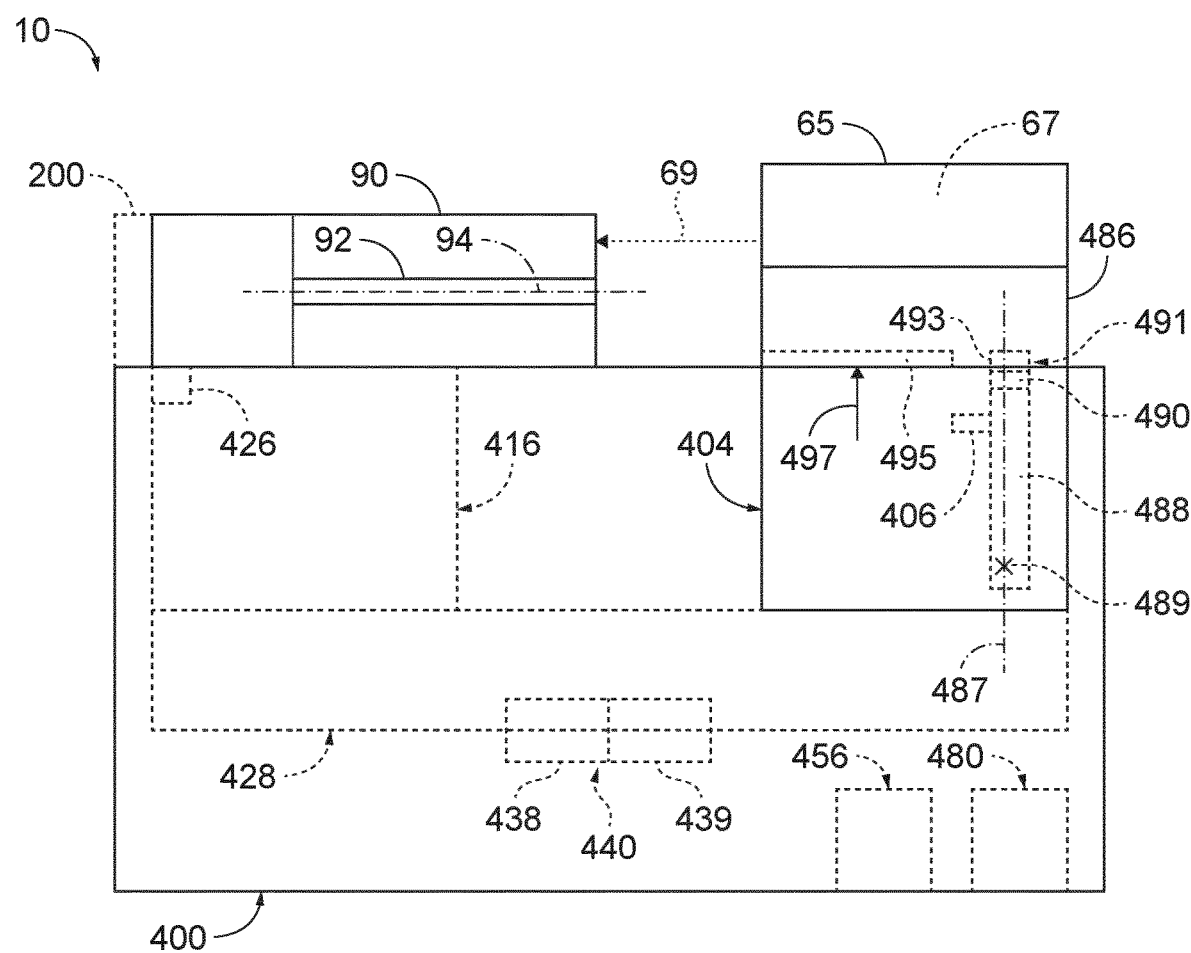
FIG. 11 is a schematic illustration of examples of circular saws that emphasize a lock assembly, according to the present disclosure.

FIG. 11 is a schematic illustration of examples of circular saws 10 that emphasize a lock assembly 400, according to the present disclosure. FIGS. 12-28 are less schematic illustrations of examples of components of a circular saw 10 that emphasize an example of a lock assembly 400, according to the present disclosure. Circular saws 10 of FIGS. 11-28 may include and/or be more detailed and/or different illustrations, views, and/or examples of circular saws 10 of FIGS. 1-10. As such, any of the structures, functions, and/or features disclosed herein with reference to circular saws 10 of FIGS. 11-28 may be included in and/or utilized with circular saws 10 of FIGS. 1-10 without departing from the scope of the present disclosure. Similarly, any of the structures, functions, and/or features disclosed herein with reference to circular saws 10 of FIGS. 1-10 may be included in and/or utilized with circular saws 10 of FIGS. 11-28 without departing from the scope of the present disclosure.

As illustrated collectively by FIGS. 11-28, lock assemblies 400 may include a switch lock 404, which also may be referred to herein as a primary switch lock 404, and/or a plunge lock mechanism 456. Lock assemblies 400 also may include an arbor lock mechanism 416 and/or a plunge positioning mechanism 480. Plunge positioning mechanism 480 may include a plunge enabling structure 482 and a secondary switch lock 484. As perhaps best illustrated in FIGS. 11 and 17-19, primary switch lock 404 may include a switch 65, a switch lever 486, and/or an off lock lever 488. Switch lever 486 may form a portion of and/or may be utilized to actuate switch 65.

Figure 18:
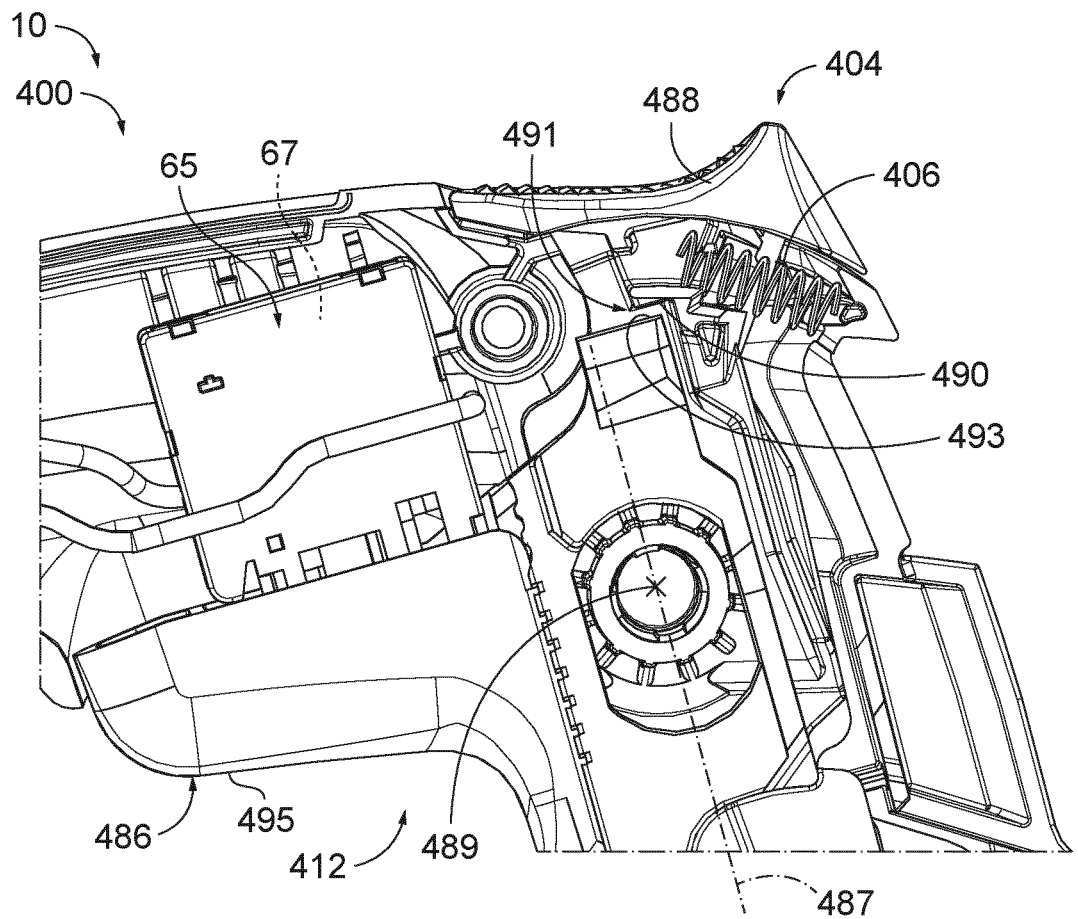
FIG. 18 is another illustration of the components of the circular saw that is illustrated in FIGS. 12-17.
Figure 19:
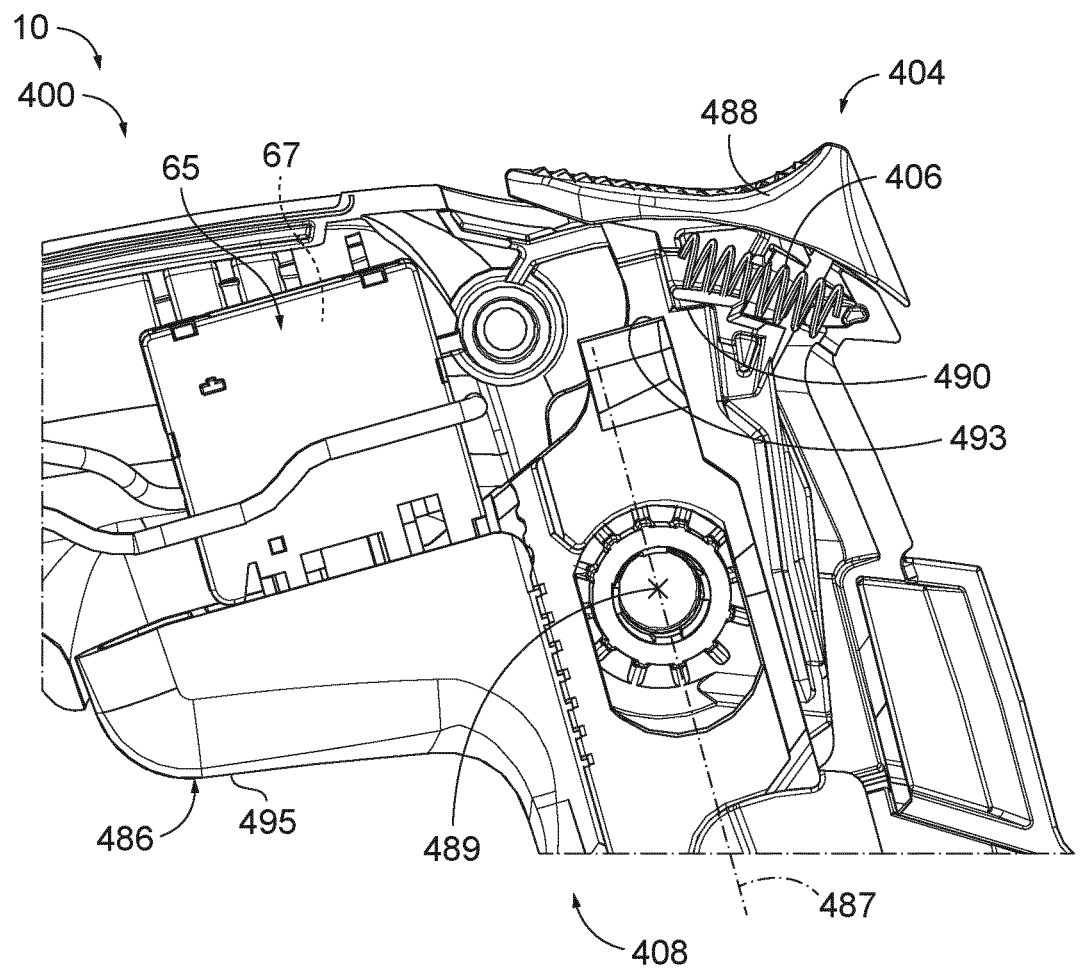
FIG. 19 is another illustration of the components of the circular saw that is illustrated in FIGS. 12-18.

Primary switch lock 404 may define a switch-unlocked configuration 408, within which the switch lock permits actuation of the switch lever by the user of the circular saw, and a switch-locked configuration 412, within which the switch lock resists actuation of the switch lever by the user of the circular saw. As an example, off lock lever 488 may be configured to be selectively actuated, by the user and via rotation about an off lock lever axis of rotation 489, to selectively transition switch lock 404 between a switch-locked configuration 412, as illustrated in FIG. 18, and a switch-unlocked configuration 408, as illustrated in FIG. 19. When in switch-locked configuration 412 of FIG. 18, off lock lever 488 and switch lever 486 may interact to avoid actuation and/or restrict motion of switch 65. In contrast, and when in a switch-unlocked configuration 408 of FIG. 19, switch lever 486 may be moved or may be free to be actuated by a user of circular saw 10, such as to provide electric current 69 to motor 90, as illustrated in FIG. 11, and/or to initiate and/or maintain rotation of circular saw blade 200.

Switch lever 486 and/or switch 65 may be biased to move the switch to a corresponding off position, in which the switch does not provide the electric current, such as via a switch biasing mechanism 67, which in some examples may be internal to switch 65. Similarly, switch lock 404 and/or off lock lever 488 thereof may be biased to move to switch-locked configuration 412, such as via a switch lock biasing mechanism 406, which also may be referred to herein as an off lock lever biasing mechanism 406. Examples of switch lock biasing mechanism 406 include a switch lock biasing mechanism resilient member, a switch lock biasing mechanism spring, a switch lock biasing mechanism coil spring, and/or a switch lock biasing mechanism torsion spring.

As perhaps best illustrated in FIGS. 11 and 18-19, off lock lever 488 may include an off lock lever stop 490, such as an interacting surface, that may restrict motion and/or actuation of switch lever 486. In addition, switch lever 486 may include a switch lever stop 493. Switch lever stop 493 may be configured to contact, to operatively contact, and/or to press against off lock lever stop 490 to resist motion of switch lever 486 when off lock lever 488 is in switch-locked configuration 412 of FIG. 18. This may produce and/or generate a contact region 491 between the off lock lever stop and the switch lever stop, as illustrated in FIG. 18. Stated another way, when switch lock 404 is in switch-locked configuration 412 of FIG. 18, off lock lever stop 490 may operatively engage and/or press against switch lever stop 493 to resist motion of switch lever 486 to actuate switch 65. In contrast, and when switch lock 404 is in switch-unlocked configuration 408 of FIG. 19, switch lever stop 493 may be free from operative engagement with off lock lever stop 490 during actuation of switch lever 486 to actuate switch 65.

Switch lever 486 also may include a user engagement surface 495. The user engagement surface may be configured to receive actuation force 497 from the user, as illustrated in FIG. 11. Upon receipt of the actuation force, switch lever 486 may be configured to operatively translate along a switch lever translation axis 487. The switch lever translation axis may intersect, or extend through, off lock lever axis of rotation 489, as illustrated in FIGS. 18-19.

In some examples of lock assemblies 400, user engagement surface 495 and switch lever stop 493 may be at least partially, or even completely, on opposed sides of switch lever translation axis 487. In some examples, user engagement surface 495 and contact region 491 of FIG. 18 may be at least partially, or even completely, on opposed sides of switch lever translation axis 487. In some examples, switch lock 404 and/or off lock lever 488 and switch lever 486 thereof may be configured such that actuating (e.g., pulling and/or squeezing) to apply the actuation force) switch lever 486 while the switch lock is in switch-locked configuration 412 of FIG. 18 generates an engagement force between the switch lock and the switch lever, such as between off lock lever stop 490 and switch lever stop 493. In some such examples, a magnitude of this engagement force may increase with an increase in the actuation force.

Stated another way, the off lock lever and the switch lever may be configured such that if the user intentionally or unintentionally exerts a force to switch lever 486, such as to intentionally or accidentally actuate switch lever 486, without first actuating off lock lever 488, off lock lever stop 490 may resist motion of the switch lever. This resistance may increase with increasing force applied to the switch lever, thereby decreasing a potential for inadvertent actuation of switch 65 via actuation of switch lever 486 without first actuating off lock lever 488.

In some examples, and when switch lock 404 is in switch-locked configuration 412 of FIG. 18, application of the actuation force to switch lever 486 may cause the switch lever to apply a tensile force, and in some examples only a tensile force, to switch lock 404 and/or to off lock lever 488 thereof. In some examples, application of the actuation force to the switch lever also may cause the switch lever to apply a torsional force to the switch lock and/or to off lock lever 488 thereof. In some such examples, a magnitude of the tensile force may be greater than a magnitude of the torsional force. In some such examples, application of the actuation force may urge switch lock 404 and/or off lock lever 488 thereof toward switch-locked configuration 412 of FIG. 18, such as via the torsional force. In some such examples, application of the actuation force may urge switch lock 404 and/or off lock lever 488 thereof away from switch-unlocked configuration 408 of FIG. 19, such as via the torsional force.

In some examples, and when switch lock 404 is in switch-unlocked configuration 408 of FIG. 19, and during application of the actuation force to switch lever 486, the switch lever may be free from contact with switch lock 404 and/or with off lock lever 488 thereof. Additionally or alternatively, the switch lever may be only in sliding contact with switch lock 404 and/or with the off lock lever. Additionally or alternatively, the switch lever may be free from the engagement force exerted by the switch lock and/or by the off lock lever.

Figure 12:
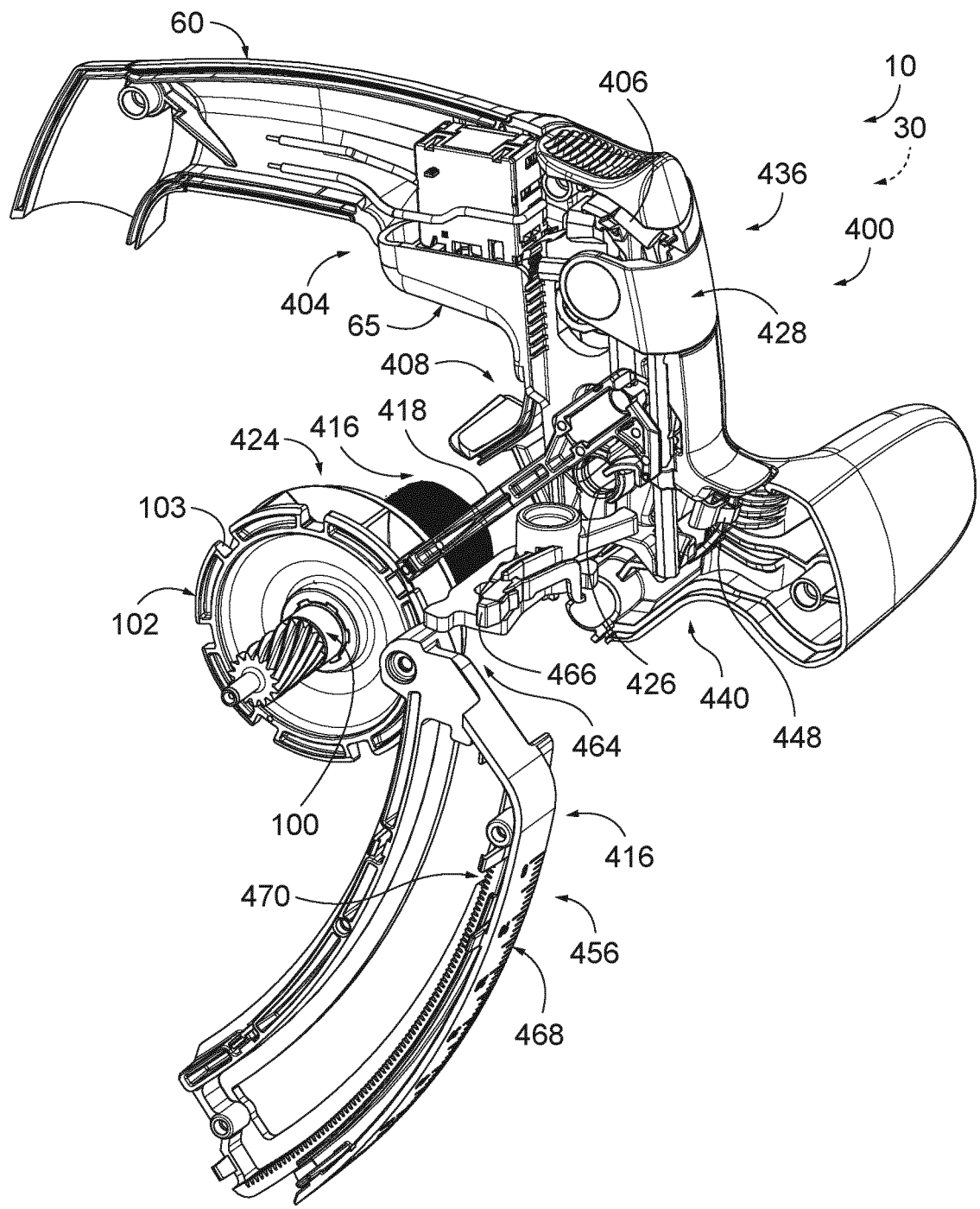
FIG. 12 is a less schematic illustration of an example of components of a circular saw that emphasize an example of a lock assembly, according to the present disclosure.
Figure 13:
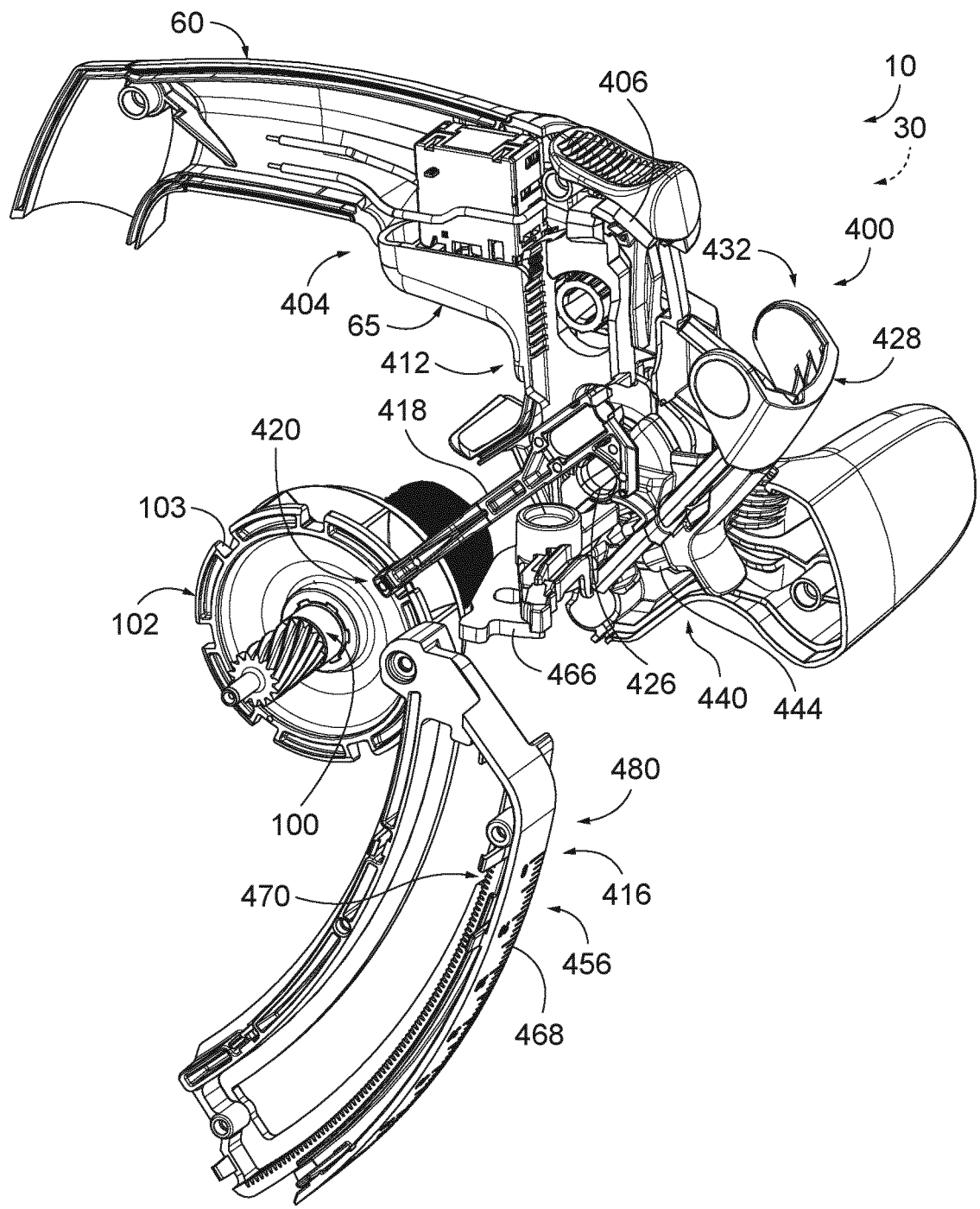
FIG. 13 is another illustration of the components of the circular saw that is illustrated in FIG. 12.
Figure 14:
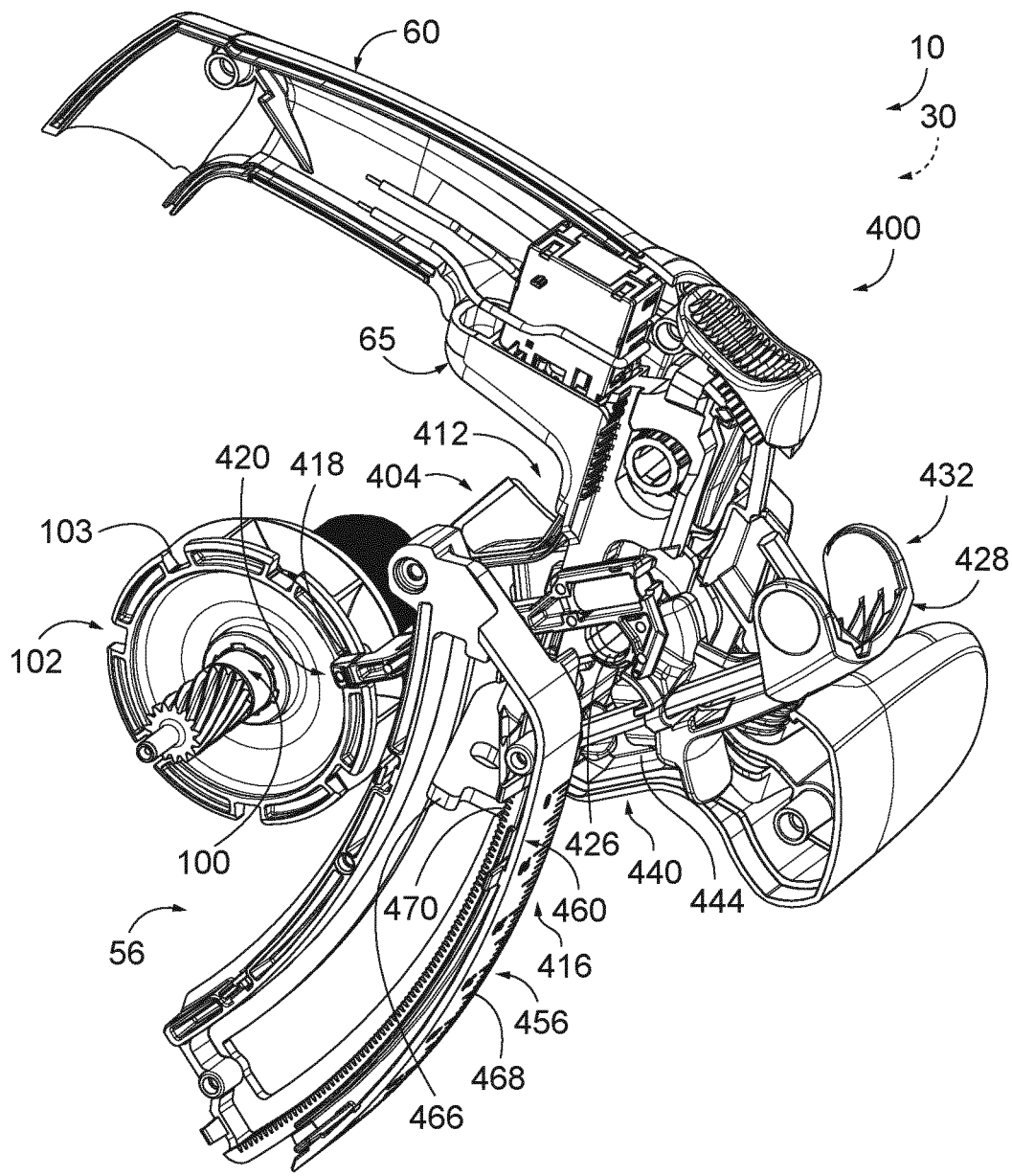
FIG. 14 is another illustration of the components of the circular saw that is illustrated in FIGS. 12-13.
Figure 20:
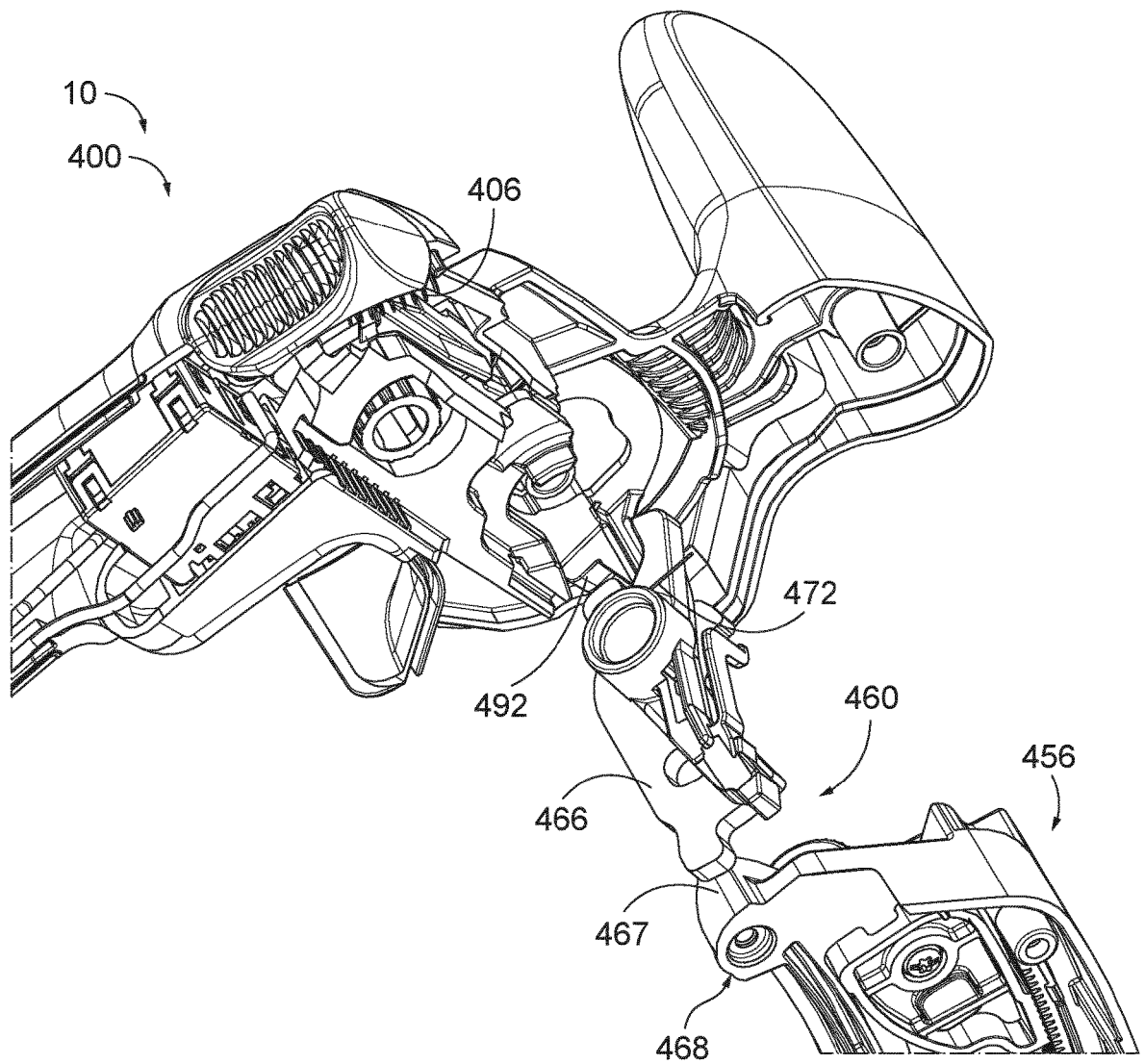
FIG. 20 is another illustration of the components of the circular saw that is illustrated in FIGS. 12-19.
Figure 21:
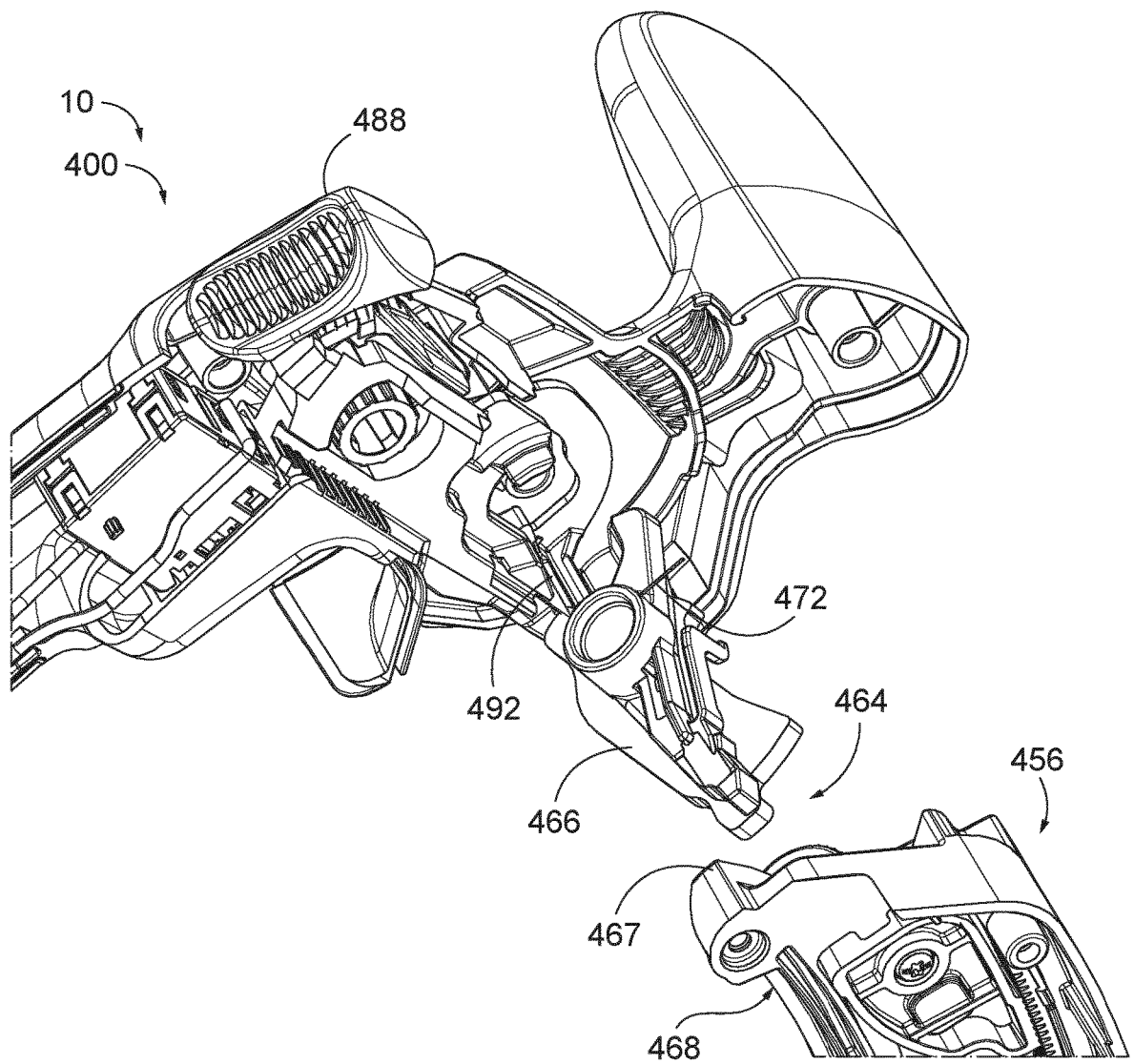
FIG. 21 is another illustration of the components of the circular saw that is illustrated in FIGS. 12-20.

In examples of circular saws 10 that are, or include the structures and/or features of, plunge saw 30, lock assembly 400 further may include a plunge lock 456, which is illustrated in FIGS. 11-14 and 20-24. Plunge lock 456, when present, may define a plunge locked configuration 460, as illustrated in FIGS. 14 and 20, and a plunge unlocked configuration 464, as illustrated in FIGS. 12 and 21. When in plunge locked configuration 460, plunge lock 456 may restrict plunging of the plunge saw. As an example, plunge lock 456 may block the movement of motor 90 and/or circular saw blade 200 relative to workpiece support 300 and/or in a direction that is perpendicular to the workpiece support. Stated another way, and when in plunge locked configuration 460, motion and/or rotation of circular saw blade 200 and/or of motor 90 relative to workpiece support 300 and/or about workpiece support pivot 316 may be resisted and/or restricted by the plunge lock. Also when in plunge locked configuration 460, at least a region of the circular saw blade is covered by blade guard 80, as illustrated in FIG. 5, such as to prevent the circular saw blade from being touched by the user of the circular saw. In contrast, and when in plunge unlocked configuration 464, motor 90 and/or circular saw blade 200 may be free to move and/or rotate, relative to workpiece support 300, such that the circular saw blade protrudes through a plane defined by arbor-opposed side 312 of the workpiece support and/or projects from the arbor-opposed side of the workpiece support, as illustrated in FIG. 4.

Plunge lock 456 may include any suitable structure that may be configured to selectively permit and/or restrict plunging of the plunge saw, such as via transitioning between plunge locked configuration 460 and plunge unlocked configuration 464. As an example, and as illustrated in FIGS. 20-21, plunge lock 456 may include a plunge lock arm 466. When in plunge locked configuration 460 of FIG. 20, plunge lock arm 466 may interact with and/or contact a locking surface 467 of a plunge guide assembly 468 of plunge lock 456. In contrast, when in plunge unlocked configuration 464, plunge lock arm 466 may move and/or rotate such that the plunge lock arm does not interact and/or contact locking surface 467, as illustrated in FIG. 21. In some examples, plunge lock 456 further may include a plunge lock lever 492 that is configured to actuate plunge lock arm 466. Plunge lock lever 492 may form a portion of off lock lever 488, thereby permitting both actuation of switch 65 and plunging of the circular saw upon actuation of off lock lever 488.

Plunge lock arm 466 may be biased toward and/or to plunge locked configuration 460, such as via a plunge lock biasing mechanism 472. Examples of plunge lock biasing mechanism 472 include a plunge lock biasing mechanism spring, a plunge lock biasing mechanism torsion spring, and/or a plunge lock biasing mechanism coil spring.

Plunge lock biasing mechanism 472 and switch lock biasing mechanism 406 together may provide redundant mechanisms via which circular saws 10, according to the present disclosure, decrease a potential for contact, or for inadvertent contact, between circular saw blade 200 and a user of the circular saw. Stated another way, it may be necessary to overcome the bias provided by both plunge lock biasing mechanism 472 and switch lock biasing mechanism 406 before a rotating circular saw blade 200 may be exposed in a manner that permits contact between the rotating circular saw blade and the user.

As perhaps best illustrated in FIGS. 11-15, 17, and 22-28, lock assembly 400 may include an assembly lever 428. Assembly lever 428 also may be referred to herein as a blade change lever 428. Assembly lever 428 may be configured to be selectively transitioned between a blade-change mode orientation 432 and a material-cutting mode orientation 436. Such a transition may selectively and/or concurrently transition or otherwise configure primary switch lock 404, an arbor lock 416, plunge lock 456, plunge positioning mechanism 480, and/or the secondary switch lock 484 between corresponding locked and unlocked states. Stated another way, assembly lever 428 may be configured to be transitioned between a configuration that permits and/or facilitates removal and/or changing of circular saw blade 200, i.e., blade-change mode orientation 432, and a configuration that permits and/or facilitates operation of the circular saw to cut a workpiece, i.e., material-cutting mode orientation 436.

As an example, when assembly lever 428 is in blade-change mode orientation 432, and as illustrated in FIGS. 13-14, switch lock 404 is in a corresponding switch-locked configuration 412, and arbor lock 416 is in a corresponding arbor-locked configuration 420. In contrast, when assembly lever 428 is in material-cutting mode orientation 436, and as illustrated in FIG. 12, switch lock 404 is in a corresponding switch-unlocked configuration 408, and arbor lock 416 is in a corresponding arbor-unlocked configuration 424.

As discussed, when switch lock 404 is in switch-unlocked configuration 408, switch 65 may be actuated by the user, such as to provide the electric current to the at least one other component of the circular saw. In contrast, when switch lock 404 is in switch-locked configuration 412, lock assembly 400 resists actuation of switch 65 by the user of the circular saw and/or the switch is restricted from providing the electric current to the at least one other component of the circular saw.

Assembly lever 428 may be configured to be selectively transitioned from material-cutting mode orientation 436 to blade-change mode orientation 432 to permit and/or to facilitate a blade change of the circular saw blade. Additionally or alternatively, assembly lever 428 may be configured to be selectively transitioned from blade-change mode orientation 432 to material-cutting mode orientation 436 to permit and/or to facilitate rotation of the circular saw blade and/or operation of the circular saw to cut a workpiece.

Figure 15:
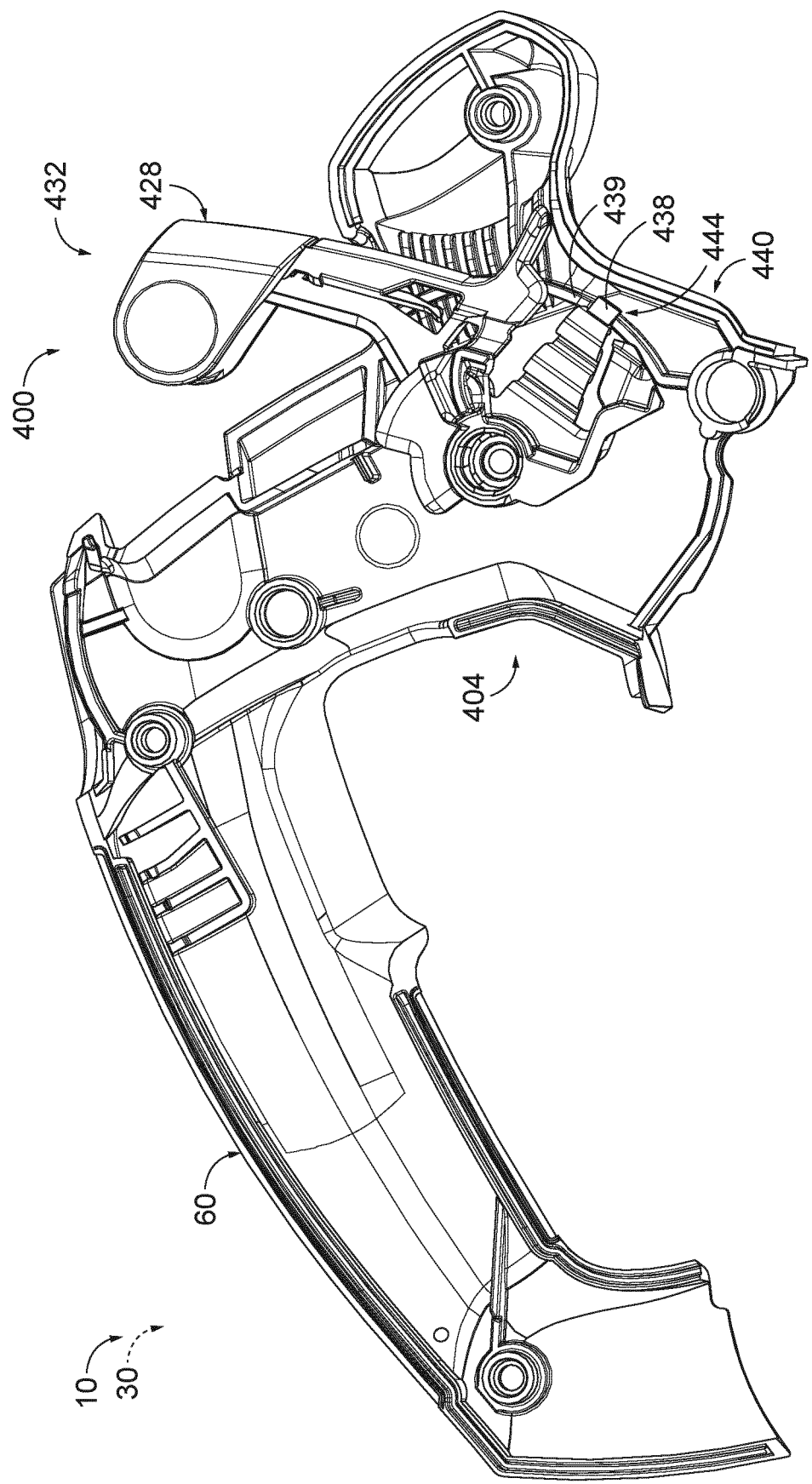
FIG. 15 is another illustration of the components of the circular saw that is illustrated in FIGS. 12-14.
Figure 16:
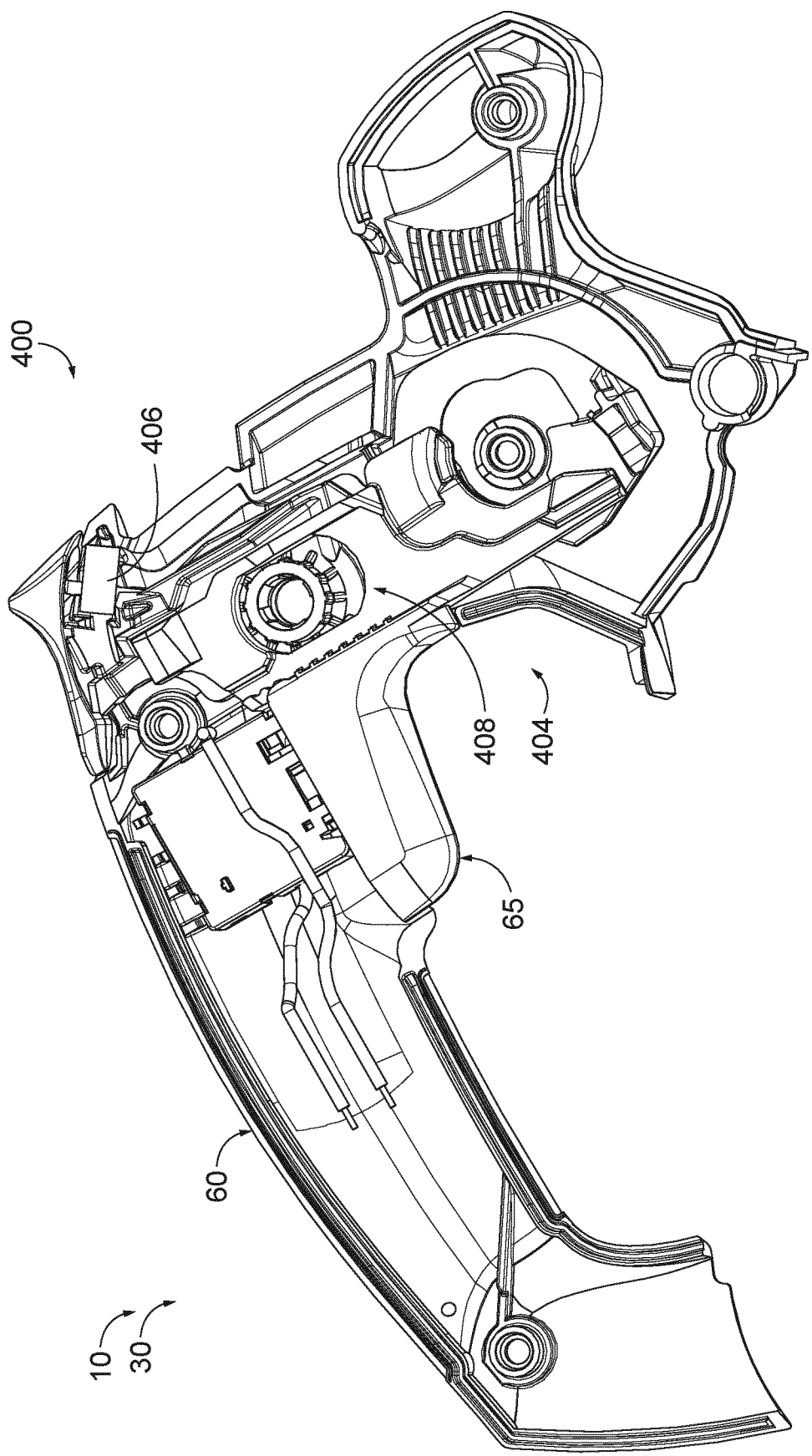
FIG. 16 is another illustration of the components of the circular saw that is illustrated in FIGS. 12-15.
Figure 17:
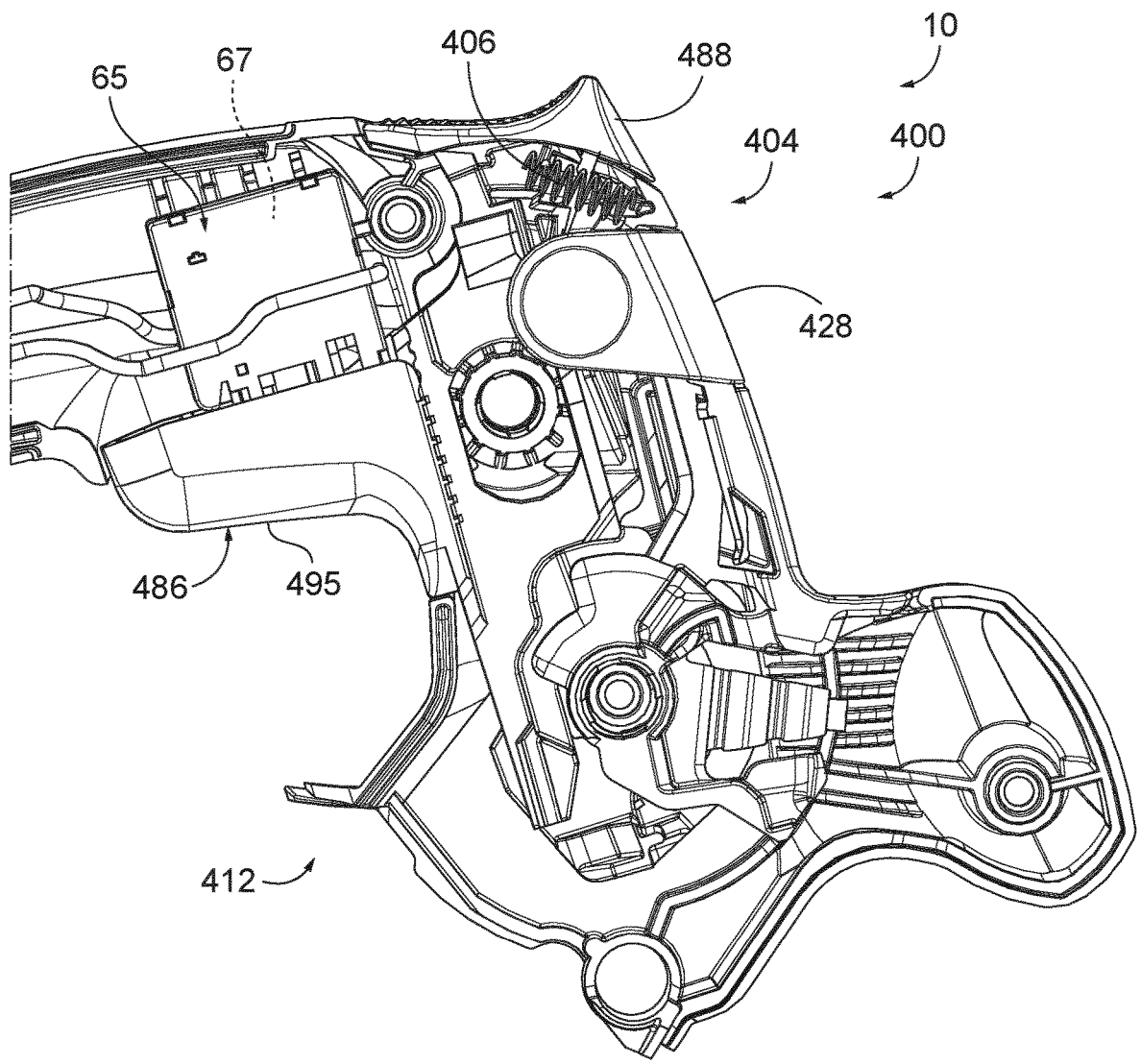
FIG. 17 is another illustration of the components of the circular saw that is illustrated in FIGS. 12-16.

In some examples of lock assembly 400, assembly lever 428 may include a plurality of detent positions 440. The plurality of detent positions may include at least a locked lever detent position 444, as illustrated in FIGS. 13-15, and an unlocked lever detent position 448, as illustrated in FIG. 12. As perhaps best illustrated in FIG. 15, lock assembly 400 and/or assembly lever 428 thereof may include, may define, and/or may be operatively attached to a resilient spring 438 configured to interlock with a corresponding plurality of spring recesses 439 to define the plurality of detent positions. In some such examples, spring recesses 439 may be spaced apart from, may be distinct from, and/or may be defined by a structure other than assembly lever 428.

Assembly lever 428 may be moved from one detent position to another detent position. When the assembly lever leaves a given detent position, resilient spring 438 may be deformed, which may provide a tactile feedback to the user. Between detent positions, resilient spring 438 may generate a frictional force, which may cause a more controllable movement. As an example, forces generated by biasing mechanisms, such as switch lock biasing mechanism 406 and/or plunge lock biasing mechanism 472, may be damped by the frictional force. When assembly lever 428 reaches and/or enters a given spring recess 439, the action of the resilient spring again may provide a tactile feedback to the user. With the above in mind, the presence of resilient spring 438 and spring recesses 439 may improve a user's ability to know and/or to recognize corresponding positions of assembly lever 428 that define material-cutting mode orientation 436 and blade-change mode orientation 432, respectively.

When assembly lever 428 is in material-cutting mode orientation 436, which also may be referred to herein as a sawing mode 436 and/or as a saw running mode 436, arbor lock 416 may be in arbor-unlocked configuration 424, and arbor 100 of circular saw 10 may be free to rotate, such as may be responsive to receipt of the motive force from motor 90. In contrast, when assembly lever 428 is in blade-change mode orientation 432, arbor lock 416 may be in arbor-locked configuration 420 and may restrict rotation of arbor 100 about an arbor rotational axis 106.

As a more specific example, and as illustrated in FIGS. 12-14, lock assembly 400 may include an arbor lock arm 418 that may be configured for selective engagement within a recess 103 of a collar 102 that extends from arbor 100. When assembly lever 428 is in material-cutting mode orientation 436 of FIG. 12, the assembly lever maintains a spaced-apart relationship between arbor lock arm 418 and collar 102. However, when assembly lever 428 is transitioned to blade-change mode orientation 432 of FIGS. 13-14, arbor lock arm 418 is biased toward collar 102, as illustrated in FIG. 13, and will move into a corresponding recess 103 when collar 102 is rotated to a corresponding angular position that aligns the arbor lock arm with the recess, as illustrated in FIG. 14. Once arbor lock arm 418 is positioned within recess 103, arbor 100 is locked, or otherwise restricted, from rotation about its axis of rotation at least until the arbor lock arm is removed, such as via actuation of assembly lever 428.

Coupling between assembly lever 428 and arbor lock arm 418 may permit an arbor lock biasing mechanism 426 to affect the orientation of the assembly lever as well. A third, or an intermediate, orientation may be defined between blade-change mode orientation 432 and material-cutting mode orientation 436 of assembly lever 428. In this third orientation, arbor lock biasing mechanism 426, which pushes arbor lock arm 418 in the direction of collar 102, may store more energy than when in the two end positions of assembly lever 428. This may create a bi-stable, or a multi-stable, mechanism via which arbor lock biasing mechanism 426 pushes the assembly lever 428 from points that are between material-cutting mode orientation 436 and blade-change mode orientation 432 toward and/or to a corresponding one of the orientations.

In some examples, the intermediate orientation also may be a stable, or semi-stable, position. In some such examples, arbor lock biasing mechanism 426 may not urge assembly lever 428 from the intermediate orientation. However, arbor lock biasing mechanism 426 may urge the assembly lever toward the material-cutting mode orientation when the assembly lever is between the intermediate orientation and the material cutting-mode orientation and/or may urge the assembly lever toward the blade-change mode orientation when the assembly lever is between the blade-change mode orientation and the intermediate orientation. Such a configuration may decrease a potential for an unexpected, or undesired, change in orientation of assembly lever 428 during operation of the circular saw and/or while changing the circular saw blade. Examples of arbor lock biasing mechanism 426 include an arbor lock biasing mechanism resilient member, an arbor lock biasing mechanism spring, an arbor lock biasing mechanism coil spring, and an arbor lock biasing mechanism torsion spring.

Figure 22:
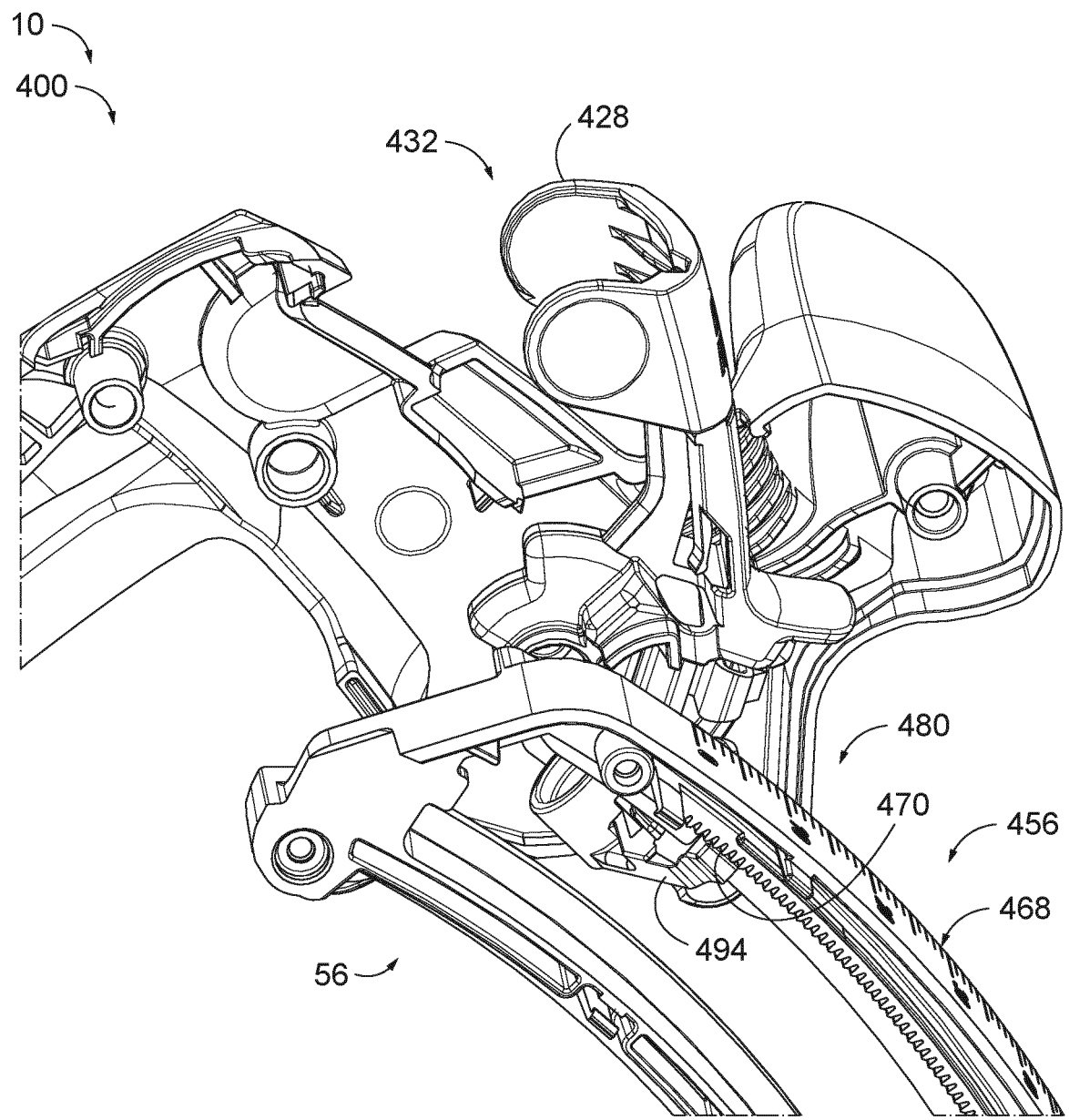
FIG. 22 is another illustration of the components of the circular saw that is illustrated in FIGS. 12-21.
Figure 23:
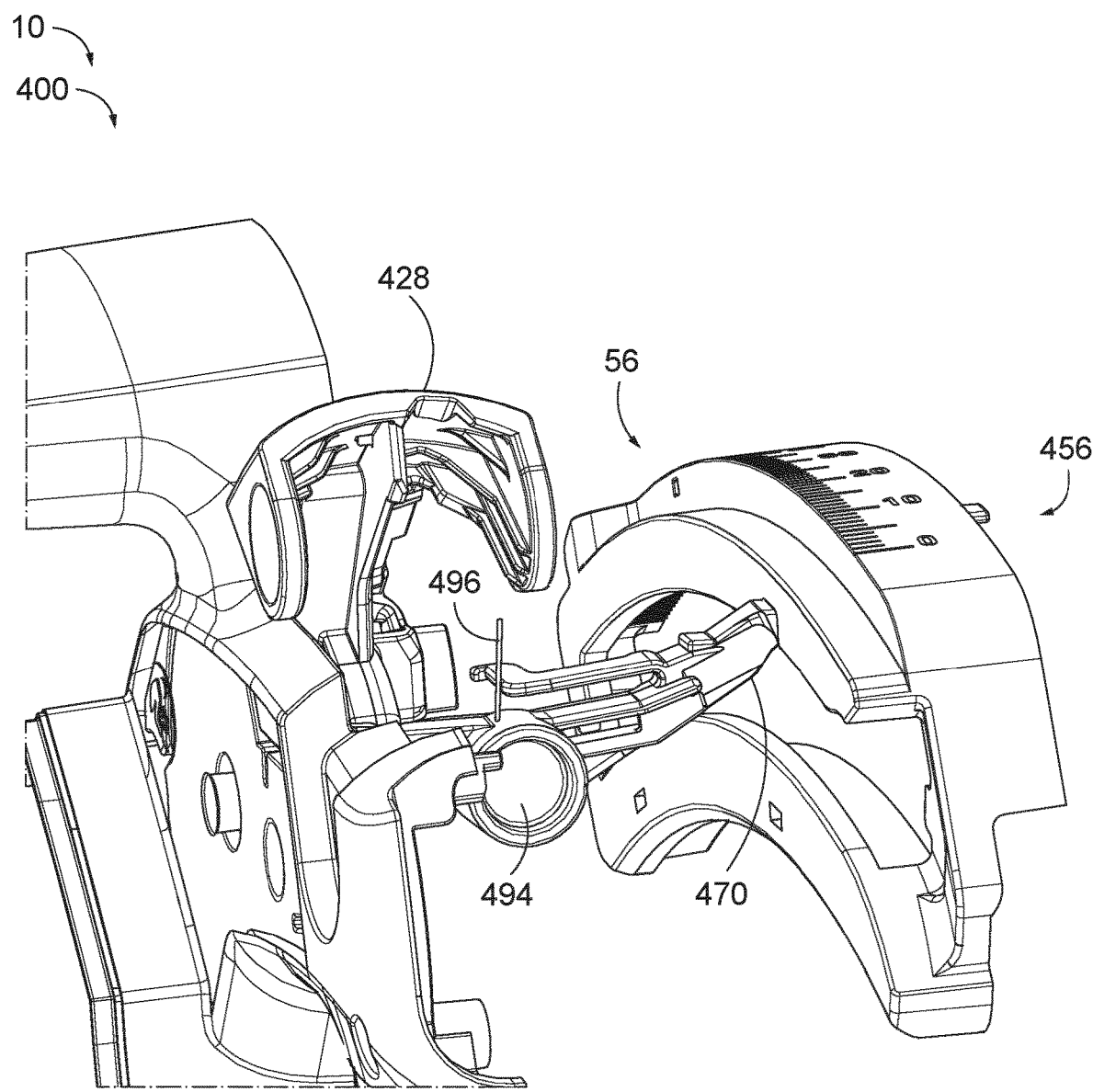
FIG. 23 is another illustration of the components of the circular saw that is illustrated in FIGS. 12-22.
Figure 24:
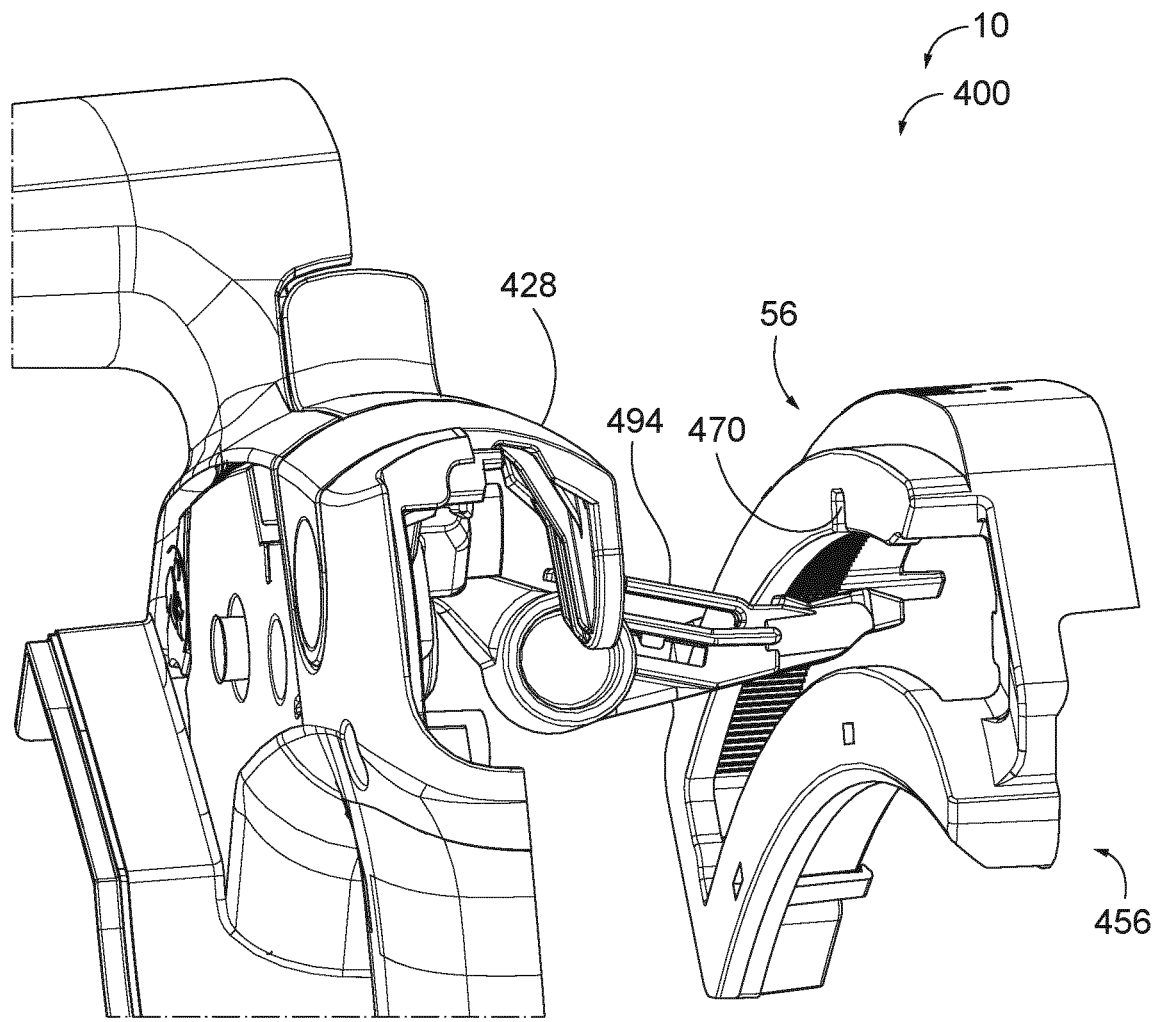
FIG. 24 is another illustration of the components of the circular saw that is illustrated in FIGS. 12-23.

In order to facilitate a blade change of circular saw blade 200, it may be beneficial to lock circular saws 10 that include plunge saws 30 at a certain, a predetermined, and/or a fixed plunge orientation, which may be an intermediate plunge orientation between fully retracted orientation 54 and fully plunged orientation 52. An example of such an intermediate plunge orientation is illustrated in FIGS. 14 and 22, and indicated at 56. Such an intermediate plunge position may facilitate access to the fastener that operatively attaches the circular saw blade to the circular saw.

With this in mind, lock assembly 400 and/or plunge positioning mechanism 480 may be configured to define, or to at least temporarily lock the circular saw in, intermediate plunge orientation 56. This may be accomplished in any suitable manner. As an example, and as perhaps best illustrated in FIGS. 22-24, lock assembly 400 may include a plunge positioning arm 494, and plunge guide assembly 468 may define a plunge positioning arm recess 470.

This mechanism may include the assembly lever 428, a spring-loaded plunge positioning arm 494 and a plunge guide assembly 468 that defines a plunge positioning arm recess 470. In such a configuration, and when assembly lever 428 is in material cutting mode 436, the assembly lever urges plunge positioning arm 494 away from plunge positioning arm recess 470. As such, the plunge positioning arm will not interlock with the plunge positioning arm recess and/or the circular saw may move between the fully plunged orientation and the fully retracted orientation.

However, when assembly lever 428 is in blade-change mode orientation 432, the assembly lever permits plunge positioning arm 494 to move, or to be biased toward, plunge positioning arm recess 470. As such, and when the plunge positioning arm is aligned with the plunge positioning arm recess, the plunge positioning arm interlocks with the plunge positioning arm recess, thereby locking the circular saw in intermediate plunge orientation 56, as perhaps best illustrated in FIGS. 14 and 22-24. In some examples, a plunge positioning arm biasing mechanism 496 may urge, or bias, the plunge positioning arm toward and/or into the plunge positioning arm recess. Stated another way, when the plunging movement reaches the blade change position illustrated in FIGS. 14 and 22, plunge positioning arm biasing mechanism 496 may urge plunge positioning arm 494 into plunge positioning arm recess 470, thereby stopping plunging motion in the intermediate plunge orientation, which also may be referred to herein as the blade change position.

As discussed, plunge lock arm 466 may selectively disable plunging of motor 90 and/or circular saw blade 200 relative to workpiece support 300. With this in mind, it may be beneficial to selectively transition plunge lock arm 466 to a configuration in which the motor and/or the circular saw blade may plunge relative to the workpiece support, such as to permit and/or facilitate the blade change discussed above. With this in mind, and in examples of circular saws 10 that are or include plunge saw 30, lock assembly 400 further may include a plunge lock deactivation mechanism, which the user may utilize to permit plunging and actuation of plunge positioning mechanism 480 in one single movement of assembly lever 428.

Figure 25:
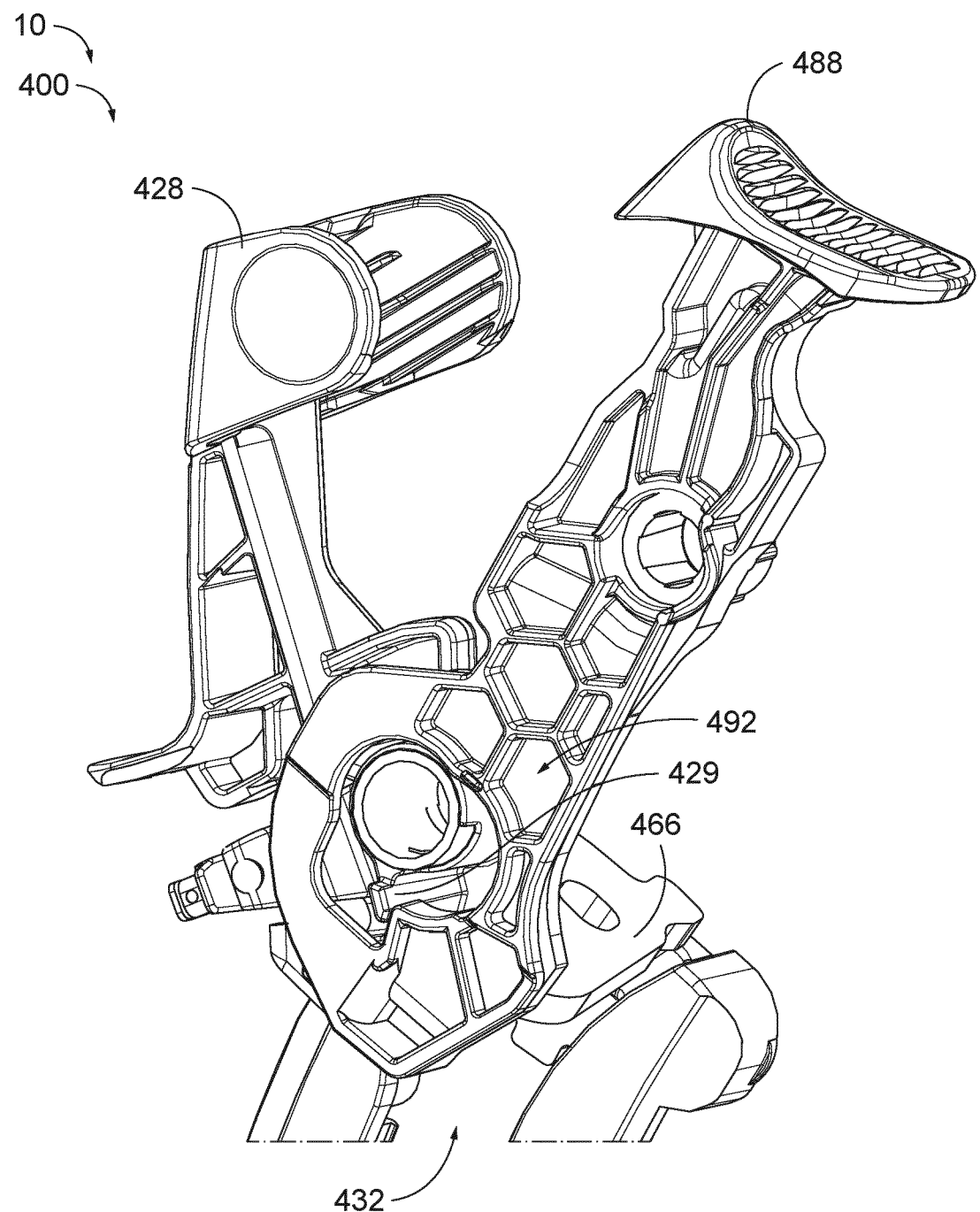
FIG. 25 is another illustration of the components of the circular saw that is illustrated in FIGS. 12-24.
Figure 26:
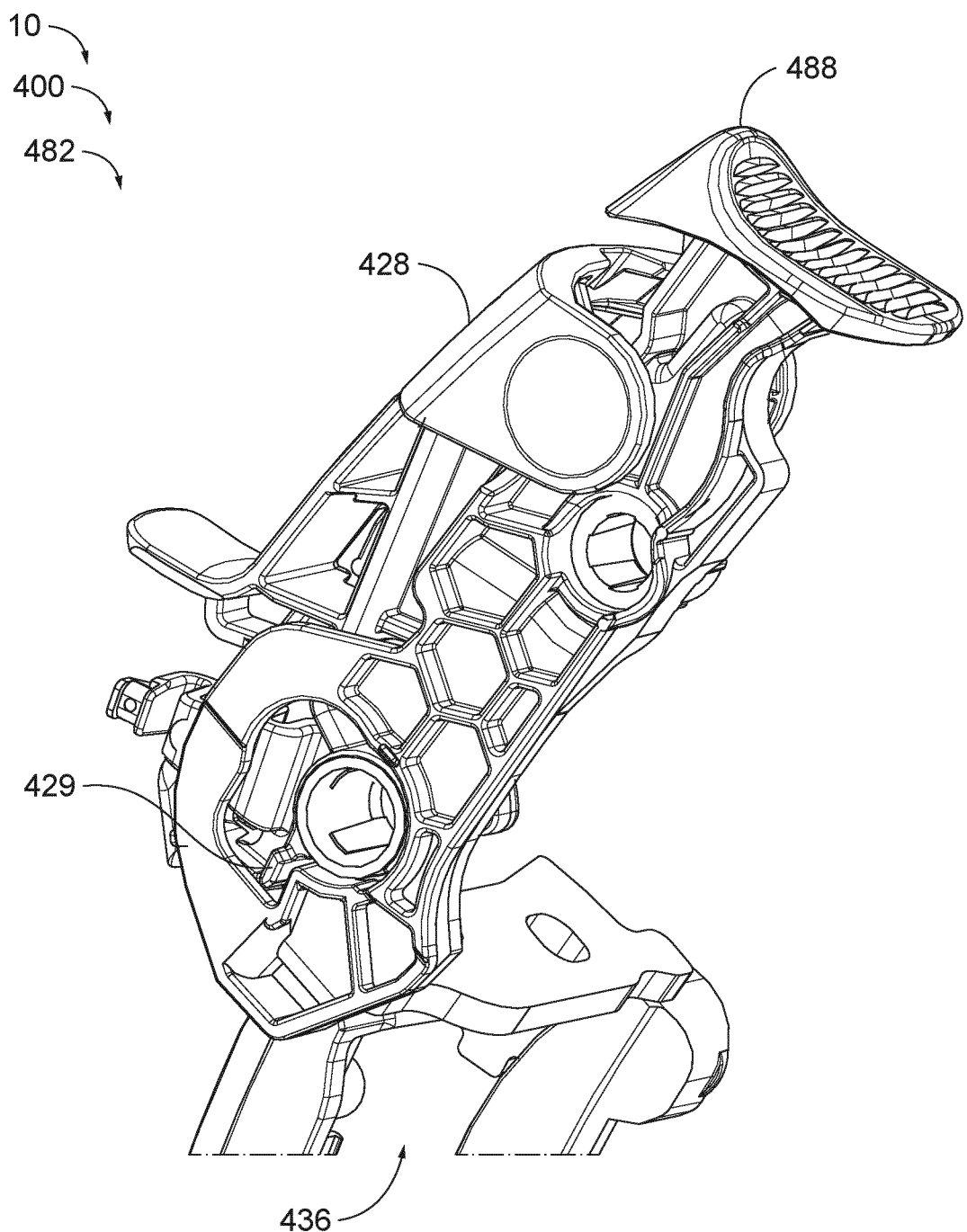
FIG. 26 is another illustration of the components of the circular saw that is illustrated in FIGS. 12-25.

This may be accomplished in any suitable manner. As an example, assembly lever 428 may include a plunge enabling surface 429, as illustrated in FIGS. 25 and 26. Plunge enabling surface 429 may selectively enable and/or disable actuation of plunge lock arm 466 and/or plunge lock lever 492. As an example, when assembly lever 428 is in material-cutting mode orientation 436, the plunge lock lever may urge plunge lock arm 466 and plunge positioning arm 494 to corresponding orientations that permit plunging of the circular saw. In contrast, when assembly lever 428 is in blade-change mode orientation 432, the assembly lever may urge plunge lock arm 466 toward a corresponding orientation that permits plunging of the circular saw and also may urge plunge lock lever 492 toward and/or into plunge positioning arm recess 470, such as to define intermediate plunge orientation 56.

Figure 28:
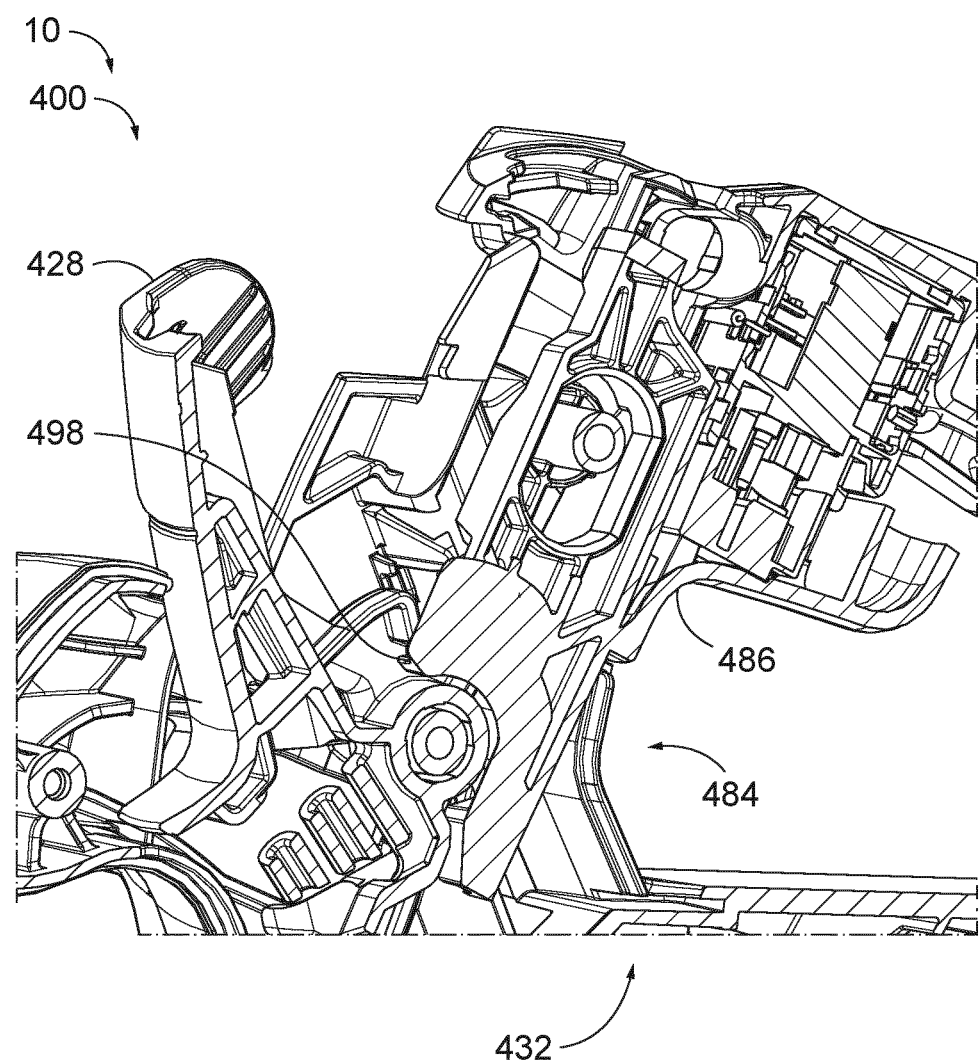
FIG. 28 is another illustration of the components of the circular saw that is illustrated in FIGS. 12-27.

Plunge lock 456 may be connected to the primary switch lock 404 such that deactivation of plunge lock 456 causes deactivation of switch lock 404. To keep switch lever 486 locked in the off position when assembly lever 428 is in blade-change mode orientation 432 that is illustrated in FIGS. 13-15, lock assembly 400 may include secondary switch lock 484. As illustrated in FIG. 28, secondary switch lock 484 may be defined by a blocking surface 498 of assembly lever 428 that may interact with, or selectively resist actuation of, switch lever 486.

Figure 27:
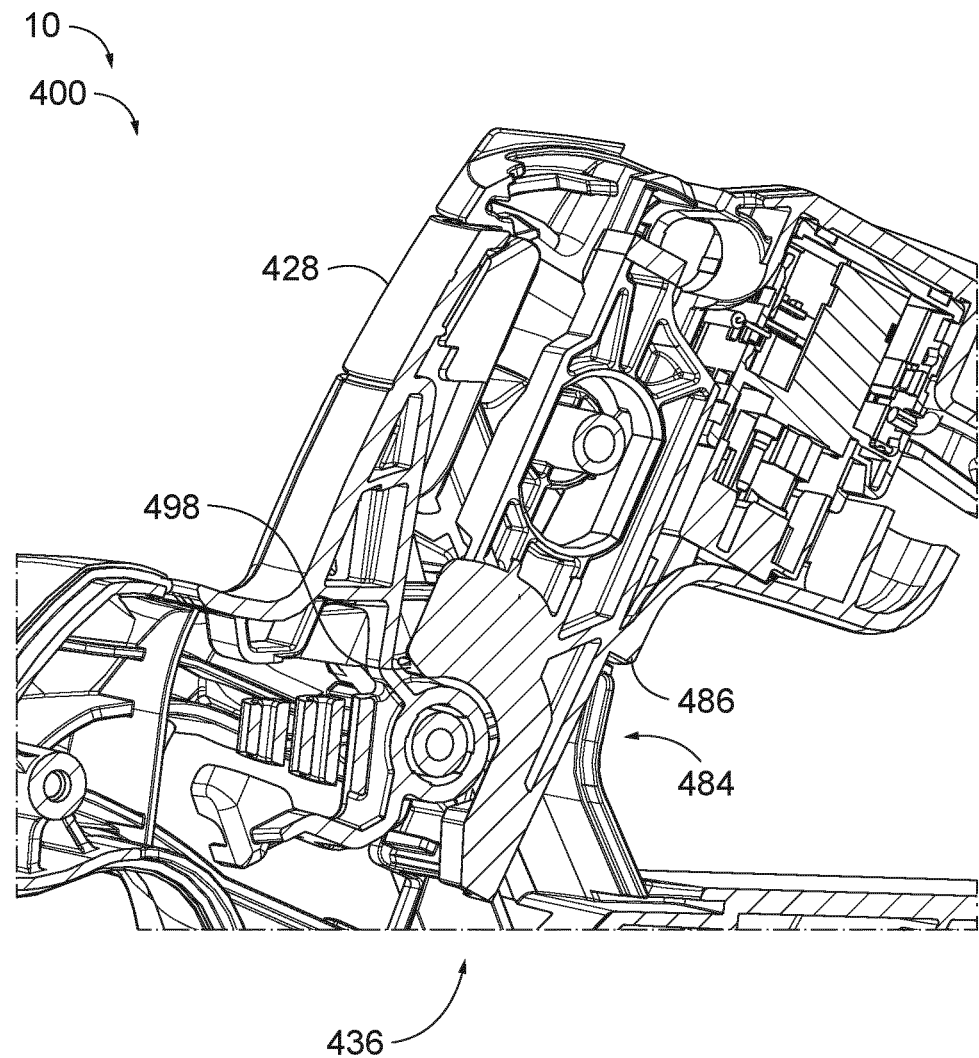
FIG. 27 is another illustration of the components of the circular saw that is illustrated in FIGS. 12-26.

As an example, when assembly lever 428 is in material-cutting mode orientation 436, and as illustrated in FIG. 27, blocking surface 498 may not resist actuation of switch lever 486, blocking surface 498 stays apart from switch lever 486, and/or the movement of switch lever 486 is not restricted by secondary switch lock 484. If the primary switch lock 404 is disabled, the switch lever 486 can be pulled to start the saw with switch 65. In contrast, when assembly lever 428 is in blade-change mode orientation 432, and as illustrated in FIG. 28, blocking surface 498 restricts motion, or actuation, of the switch lever. As such, the circular saw cannot be started.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

Illustrative, non-exclusive examples of circular saws according to the present disclosure are presented in the following enumerated paragraphs.

A1. A circular saw, comprising:
a motor including a motor shaft configured to rotate about a shaft rotational axis;
an arbor configured to operatively attach a circular saw blade to the circular saw and to receive a torque from the motor when the motor shaft rotates about the shaft rotational axis;
a switch configured to selectively apply an electric current to the motor; and
a switch lever configured to be selectively actuated, by a user of the circular saw and via application of an actuation force, to actuate the switch and thereby to apply the electric current to the motor.

A2. The circular saw of paragraph A1, wherein the circular saw further includes a lock assembly optionally that includes a switch lock, wherein the switch lock:
(i) defines a switch-locked configuration in which the switch lock resists actuation of the switch lever by the user of the circular saw; and
(ii) defines a switch-unlocked configuration in which the switch lever is free to be actuated by the user of the circular saw to actuate the switch.

A3. The circular saw of paragraph A2, wherein the switch lock includes an off lock lever configured to be selectively actuated, by the user and via rotation about an off lock lever axis of rotation, to selectively transition the switch lock between the switch-locked configuration and the switch-unlocked configuration, wherein the off lock lever includes an off lock lever stop, wherein the switch lever includes a switch lever stop, which is configured to contact the off lock lever stop to resist motion of the switch lever when the off lock lever is in the switch-locked configuration, wherein the switch lever includes a user engagement surface, which is configured to receive the actuation force from the user, wherein, upon receipt of the actuation force, the switch lever is configured to operatively translate along a switch lever translation axis that intersects the off lock lever axis of rotation, and further wherein the user engagement surface and the switch lever stop are at least partially, or even completely, on opposed sides of the switch lever translation axis.

A4. The circular saw of paragraph A3, wherein the user engagement surface and a contact region between the switch lever stop and the off lock lever stop are at least partially, or even completely, on opposed sides of the switch lever translation axis.

A5. The circular saw of any of paragraphs A3-A4, wherein at least one of:
- (i) when the switch lock is in the switch-locked configuration, the off lock lever stop operatively engages the switch lever stop to resist motion of the switch lever to actuate the switch; and
- (ii) when the switch lock is in the switch-unlocked configuration, the switch lever stop is free from operative engagement with the off lock lever stop during actuation of the switch lever to actuate the switch.

A6. The circular saw of any of paragraphs A2-A5, wherein the switch lock is configured such that, when the switch lock is in the switch-locked configuration, application of the actuation force to the switch lever generates an engagement force between the switch lock and the switch lever, and further wherein a magnitude of the engagement force increases with an increase in the actuation force.

A7. The circular saw of any of paragraphs A2-A6, wherein the switch lock is configured such that, when the switch lock is in the switch-locked configuration, application of the actuation force to the switch lever causes the switch lever to apply a tensile force, or only a tensile force, to the switch lock.

A8. The circular saw of paragraph A7, wherein, when the switch lock is in the switch-locked configuration, application of the actuation force to the switch lever further causes the switch lever to apply a torsional force to the switch lock.

A9. The circular saw of paragraph A8, wherein a magnitude of the tensile force is greater than a magnitude of the torsional force.

A10. The circular saw of any of paragraphs A8-A9, wherein the torsional force at least one of:
- (i) urges the switch lock toward the switch-locked configuration; and
- (ii) urges the switch lock away from the switch-unlocked configuration.

A11. The circular saw of any of paragraphs A2-A10, wherein the switch lock is configured such that, when the switch lock is in the switch-locked configuration, application of the actuation force to the switch lever at least one of:
- (i) urges the switch lock toward the switch-locked configuration; and
- (ii) urges the switch lock away from the switch-unlocked configuration.

A12. The circular saw of any of paragraphs A2-A11, wherein, when the switch lock is in the switch-unlocked configuration and the actuation force is applied to the switch lever, at least one of:
- (i) the switch lever is free from contact with the switch lock;
- (ii) the switch lever is only in sliding contact with the switch lock; and
- (iii) the switch lever is free from a/the engagement force exerted by the switch lock.

A13. The circular saw of any of paragraphs A2-A12, wherein the switch lock includes a switch lock biasing mechanism that urges the switch lock toward the switch-locked configuration.

A14. The circular saw of paragraph A13, wherein the switch lock biasing mechanism includes at least one of a switch lock biasing mechanism resilient member, a switch lock biasing mechanism spring, a switch lock biasing mechanism coil spring, and a switch lock biasing mechanism torsion spring.

A15. The circular saw of any of paragraphs A2-A14, where the lock assembly includes an arbor lock, wherein the arbor lock defines:
- (i) an arbor-locked configuration in which the arbor lock resists rotation of the arbor about the shaft rotational axis; and
- (ii) an arbor-unlocked configuration in which the arbor lock permits rotation of the arbor about the shaft rotational axis.

A16. The circular saw of paragraph A16, wherein the arbor lock includes an arbor lock biasing mechanism that urges the arbor lock toward the arbor-locked configuration.

A17. The circular saw of any of paragraphs A15-A16, wherein a/the switch lock biasing mechanism is at least one of:
- (i) spaced apart from a/the arbor lock biasing mechanism; and
- (ii) distinct from the arbor lock biasing mechanism.

A18. The circular saw of any of paragraphs A16-A17, wherein the arbor lock biasing mechanism includes at least one of an arbor lock biasing mechanism resilient member, an arbor lock biasing mechanism spring, an arbor lock biasing mechanism coil spring, and an arbor lock biasing mechanism torsion spring.

A19. The circular saw of any of paragraphs A15-A18, wherein the lock assembly includes an assembly lever configured to selectively actuate the switch lock and the arbor lock, wherein the assembly lever is configured to be selectively transitioned between a blade-change mode orientation and a material-cutting mode orientation, and further wherein:
- (i) when the assembly lever is in the blade-change mode orientation, the switch lock is in the switch-locked configuration and the arbor lock is in the arbor-locked configuration; and
- (ii) when the assembly lever is in the material-cutting mode orientation, the switch lock is in the switch-unlocked configuration and the arbor lock is in the arbor-unlocked configuration.

A20. The circular saw of paragraph A19, wherein the assembly lever is configured to be selectively transitioned from the material-cutting mode orientation to the blade-change mode orientation to facilitate a blade change of the circular saw blade.

A21. The circular saw of any of paragraphs A19-A20, wherein the assembly lever is configured to be selectively transitioned from the blade-change mode orientation to the material-cutting mode orientation to facilitate operation of the circular saw to cut a workpiece.

A22. The circular saw of any of paragraphs A19-A21 wherein the assembly lever includes a plurality of detent positions, including at least a locked lever detent position, which corresponds to the blade-change mode orientation, and an unlocked lever detent position, which corresponds to the material-cutting mode orientation.

A23. The circular saw of paragraph A22, wherein the lock assembly includes a resilient spring and a plurality of spring recesses including at least a locked lever detent position spring recess and an unlocked lever detent position spring recess, and further wherein the resilient spring is configured to interlock with the plurality of spring recesses to define the plurality of detent positions.

A24. The circular saw of paragraph A23, wherein the resilient spring at least one of:

(i) is operatively attached to the assembly lever; and
(ii) is defined by the assembly lever.

A25. The circular saw of any of paragraphs A23-A24, wherein the plurality of spring recesses at least one of:
(i) is spaced apart from the assembly lever;
(ii) is distinct from the assembly lever; and
(iii) is defined by a structure other than the assembly lever.

A26. The circular saw of any of paragraphs A23-A25, wherein the lock assembly is configured such that the resilient spring is deformed as the assembly lever is moved between detent positions of the plurality of detent positions.

A27. The circular saw of any of paragraphs A23-A26, wherein the lock assembly is configured such that, as the assembly lever is moved between detent positions of the plurality of detent positions, the resilient spring generates a frictional force that resists motion of the assembly lever.

A28. The circular saw of any of paragraphs A1-A27, wherein the circular saw is a plunge saw.

A29. The circular saw of paragraph A28, wherein the plunge saw includes a workpiece support and a workpiece support pivot, wherein the workpiece support is configured to rotate relative to the arbor about the workpiece support pivot.

A30. The circular saw of paragraph A29, wherein the workpiece support includes a base plate.

A31. The circular saw of any of paragraphs A29-A30, wherein the workpiece support defines an arbor-facing side and an arbor-opposed side.

A32. The circular saw of paragraph A31, wherein the arbor is operatively attached to the arbor-facing side of the workpiece support via the workpiece support pivot.

A33. The circular saw of any of paragraphs A29-A32, wherein the arbor and the workpiece support are configured to operatively rotate, relative to one another, about the workpiece support pivot to selectively vary a region of the circular saw blade that extends on a/the arbor-opposed side of the workpiece support.

A34. The circular saw of paragraph A33, wherein a/the lock assembly includes a plunge lock, and further wherein:
(i) when a/the assembly lever is in a/the blade-change mode orientation, the plunge lock is in a plunge locked configuration in which the plunge lock resists rotation of the workpiece support relative to the arbor about the workpiece support pivot and a least a region of the saw blade extends on an arbor-opposed side of the workpiece support; and
(ii) when the assembly lever is in a/the material-cutting mode orientation, the plunge lock is in a plunge unlocked configuration in which the workpiece support is free to rotate relative to the arbor about the workpiece support pivot.

A35. The circular saw of any of paragraphs A1-A34, wherein the motor includes an electric motor.

A36. The circular saw of any of paragraphs A1-A35, wherein the circular saw further includes a gripping region configured to be gripped by a user of the circular saw during operation of the circular saw to cut a workpiece.

A37. The circular saw of any of paragraphs A1-A36, wherein the circular saw further includes a switch configured to selectively apply an electric current to at least one other component of the circular saw.

A38. The circular saw of any of paragraphs A1-A37, wherein the circular saw further includes a blade guard configured to prevent contact between the user and the saw blade.

A39. The circular saw of any of paragraphs A1-A38, wherein a/the blade guard includes a retractable region configured to retract when the circular saw is utilized to cut a/the workpiece.

A40. The circular saw of any of paragraphs A1-A39, wherein the circular saw further includes a/the workpiece support configured to position a/the workpiece and the circular saw relative to one another when the workpiece is cut by the circular saw.

A41. The circular saw of any of paragraphs A1-A40, wherein the circular saw further includes at least one of:
(i) a power supply structure configured to electrically power the circular saw;
(ii) a power cord configured to provide electric current to the circular saw; and
(iii) a battery configured to provide electric current to the circular saw.

A42. The circular saw of any of paragraphs A1-A41, wherein the circular saw is at least one of:
(i) a handheld circular saw;
(ii) a miter saw;
(iii) a radial arm saw;
(iv) a table saw;
(v) a chop saw;
(vi) a/the plunge saw;
(vii) a track saw;
(viii) a bevel saw;
(ix) an upcut saw; and
(x) a panel saw.

A43. The circular saw of any of paragraphs A1-A42, wherein the circular saw is a/the track saw.

A44. The circular saw of paragraph A43, wherein the track saw includes a/the workpiece support that defines an/the arbor-facing side and an/the arbor-opposed side.

A45. The circular saw of paragraph A44, wherein the workpiece support further includes a rib-receiving channel configured to receive a raised elongate rib of a track.

A46. The circular saw of paragraph A45, wherein the track saw further includes the track, and wherein the track includes the raised elongate rib.

A47. The circular saw of any of paragraphs A1-A46, wherein the circular saw includes the circular saw blade.

A48. The circular saw of paragraph A47, wherein the circular saw blade is operatively attached to the circular saw via the arbor for rotational motion with the arbor.

INDUSTRIAL APPLICABILITY

The circular saws disclosed herein are applicable to the power tool use industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A circular saw, comprising:
   a motor including a motor shaft configured to rotate about a shaft rotational axis;
   an arbor configured to operatively attach a circular saw blade to the circular saw and to receive a torque from the motor when the motor shaft rotates about the shaft rotational axis;
   a switch configured to selectively apply an electric current to the motor;
   a switch lever configured to be selectively actuated, by a user of the circular saw by application of an actuation force, to actuate the switch and thereby to apply the electric current to the motor; and
   a lock assembly that includes a switch lock, wherein the switch lock:
   (i) defines a switch-locked configuration in which the switch lock resists actuation of the switch lever by the user of the circular saw;
   (ii) defines a switch-unlocked configuration in which the switch lever is free to be actuated by the user of the circular saw to actuate the switch; and
   (iii) includes an off lock lever configured to be selectively actuated, by the user by rotation about an off lock lever axis of rotation, to selectively transition the switch lock between the switch-locked configuration and the switch-unlocked configuration, wherein the off lock lever includes an off lock lever stop, wherein the switch lever includes a switch lever stop, which is configured to contact the off lock lever stop to resist motion of the switch lever when the off lock lever is in the switch-locked configuration, wherein the switch lever includes a user engagement surface, which is configured to receive the actuation force from the user, wherein, upon receipt of the actuation force, the switch lever is configured to operatively translate along a switch lever translation axis that intersects the off lock lever axis of rotation, and further wherein the user engagement surface and the switch lever stop are at least partially on opposed sides of the switch lever translation axis;
   wherein the switch lock is configured such that, when the switch lock is in the switch-locked configuration, application of the actuation force to the switch lever causes the switch lever to apply a tensile force to the switch lock.

2. The circular saw of claim 1, wherein the switch lock is configured such that, when the switch lock is in the switch-locked configuration, application of the actuation force to the switch lever generates an engagement force between the switch lock and the switch lever, and further wherein a magnitude of the engagement force increases with an increase in the actuation force.

3. The circular saw of claim 2, wherein, when the switch lock is in the switch-unlocked configuration and the actuation force is applied to the switch lever, at least one of:
   (i) the switch lever is free from contact with the switch lock;
   (ii) the switch lever is only in sliding contact with the switch lock; and
   (iii) the switch lever is free from the engagement force.

4. The circular saw of claim 1, wherein, when the switch lock is in the switch-locked configuration, application of the actuation force to the switch lever further causes the switch lever to apply a torsional force to the switch lock, wherein a magnitude of the tensile force is greater than a magnitude of the torsional force.

5. The circular saw of claim 4, wherein the torsional force at least one of:
   (i) urges the switch lock toward the switch-locked configuration; and
   (ii) urges the switch lock away from the switch-unlocked configuration.

6. The circular saw of claim 1, wherein the switch lock includes a switch lock biasing mechanism that urges the switch lock toward the switch-locked configuration.

7. The circular saw of claim 6, where the lock assembly includes an arbor lock, wherein the arbor lock defines:
   (i) an arbor-locked configuration in which the arbor lock resists rotation of the arbor about the shaft rotational axis; and
   (ii) an arbor-unlocked configuration in which the arbor lock permits rotation of the arbor about the shaft rotational axis.

8. The circular saw of claim 7, wherein the arbor lock includes an arbor lock biasing mechanism that urges the arbor lock toward the arbor-locked configuration.

9. The circular saw of claim 8, wherein the switch lock biasing mechanism is at least one of:
   (i) spaced apart from the arbor lock biasing mechanism; and
   (ii) distinct from the arbor lock biasing mechanism.

10. The circular saw of claim 7, wherein the lock assembly includes an assembly lever configured to selectively actuate the switch lock and the arbor lock, wherein the assembly lever is configured to be selectively transitioned between a blade-change mode orientation and a material-cutting mode orientation, and further wherein:
    (i) when the assembly lever is in the blade-change mode orientation, the switch lock is in the switch-locked configuration and the arbor lock is in the arbor-locked configuration; and
    (ii) when the assembly lever is in the material-cutting mode orientation, the switch lock is in the switch-unlocked configuration and the arbor lock is in the arbor-unlocked configuration.

11. The circular saw of claim 10 wherein the assembly lever includes a plurality of detent positions, including at least a locked lever detent position, which corresponds to the blade-change mode orientation, and an unlocked lever detent position, which corresponds to the material-cutting mode orientation.

12. The circular saw of claim 11, wherein the lock assembly includes a resilient spring and a plurality of spring recesses including at least a locked lever detent position spring recess and an unlocked lever detent position spring recess, and further wherein the resilient spring is configured to interlock with the plurality of spring recesses to define the plurality of detent positions.

13. The circular saw of claim 12, wherein the lock assembly is configured such that the resilient spring is deformed as the assembly lever is moved between detent positions of the plurality of detent positions.

14. The circular saw of claim 12, wherein the lock assembly is configured such that, as the assembly lever is moved between detent positions of the plurality of detent positions, the resilient spring generates a frictional force that resists motion of the assembly lever.

15. A circular saw, comprising:
a motor including a motor shaft configured to rotate about a shaft rotational axis;
an arbor configured to operatively attach a circular saw blade to the circular saw and to receive a torque from the motor when the motor shaft rotates about the shaft rotational axis;
a switch configured to selectively apply an electric current to the motor;
a switch lever configured to be selectively actuated, by a user of the circular saw by application of an actuation force, to actuate the switch and thereby to apply the electric current to the motor; and
a lock assembly that includes a switch lock, wherein the switch lock:
(i) defines a switch-locked configuration in which the switch lock resists actuation of the switch lever by the user of the circular saw;
(ii) defines a switch-unlocked configuration in which the switch lever is free to be actuated by the user of the circular saw to actuate the switch; and
(iii) includes an off lock lever configured to be selectively actuated, by the user by rotation about an off lock lever axis of rotation, to selectively transition the switch lock between the switch-locked configuration and the switch-unlocked configuration, wherein the off lock lever includes an off lock lever stop, wherein the switch lever includes a switch lever stop, which is configured to contact the off lock lever stop to resist motion of the switch lever when the off lock lever is in the switch-locked configuration, wherein the switch lever includes a user engagement surface, which is configured to receive the actuation force from the user, wherein, upon receipt of the actuation force, the switch lever is configured to operatively translate along a switch lever translation axis that intersects the off lock lever axis of rotation, and further wherein the user engagement surface and the switch lever stop are at least partially on opposed sides of the switch lever translation axis;
wherein the switch lock is configured such that, when the switch lock is in the switch-locked configuration, application of the actuation force to the switch lever at least one of:
(i) urges the switch lock toward the switch-locked configuration; and
(ii) urges the switch lock away from the switch-unlocked configuration.

16. A circular saw, comprising:
a motor including a motor shaft configured to rotate about a shaft rotational axis;
an arbor configured to operatively attach a circular saw blade to the circular saw and to receive a torque from the motor when the motor shaft rotates about the shaft rotational axis;
a switch configured to selectively apply an electric current to the motor;
a switch lever configured to be selectively actuated, by a user of the circular saw by application of an actuation force, to actuate the switch and thereby to apply the electric current to the motor; and
a lock assembly that includes a switch lock, wherein the switch lock:
(i) defines a switch-locked configuration in which the switch lock resists actuation of the switch lever by the user of the circular saw;
(ii) defines a switch-unlocked configuration in which the switch lever is free to be actuated by the user of the circular saw to actuate the switch; and
(iii) includes an off lock lever configured to be selectively actuated, by the user by rotation about an off lock lever axis of rotation, to selectively transition the switch lock between the switch-locked configuration and the switch-unlocked configuration, wherein the off lock lever includes an off lock lever stop, wherein the switch lever includes a switch lever stop, which is configured to contact the off lock lever stop to resist motion of the switch lever when the off lock lever is in the switch-locked configuration, wherein the switch lever includes a user engagement surface, which is configured to receive the actuation force from the user, wherein, upon receipt of the actuation force, the switch lever is configured to operatively translate along a switch lever translation axis that intersects the off lock lever axis of rotation, and further wherein the user engagement surface and the switch lever stop are at least partially on opposed sides of the switch lever translation axis;
wherein the circular saw includes a workpiece support and a workpiece support pivot, wherein the workpiece support is configured to rotate relative to the arbor about the workpiece support pivot;
wherein the arbor and the workpiece support are configured to operatively rotate, relative to one another, about the workpiece support pivot to selectively vary a region of the circular saw blade that extends on an arbor-opposed side of the workpiece support; and
wherein the lock assembly includes an assembly lever configured to selectively actuate the switch lock and the arbor lock, wherein the assembly lever is configured to be selectively transitioned between a blade-change mode orientation and a material-cutting mode orientation, and further wherein:
(i) when the assembly lever is in the blade-change mode orientation, the switch lock is in the switch-locked configuration and the arbor lock is in the arbor-locked configuration; and
(ii) when the assembly lever is in the material-cutting mode orientation, the switch lock is in the switch-unlocked configuration and the arbor lock is in the arbor-unlocked configuration; and
wherein the lock assembly includes a plunge lock, and further wherein:
(i) when the assembly lever is in the blade-change mode orientation, the plunge lock is in a plunge locked configuration in which the plunge lock resists rotation of the workpiece support relative to the arbor about the workpiece support pivot and at least a portion of the circular saw blade extends on the arbor-opposed side of the workpiece support; and
(ii) when the assembly lever is in the material-cutting mode orientation, the plunge lock is in a plunge unlocked configuration in which the workpiece support is free to rotate relative to the arbor about the workpiece support pivot.

17. A circular saw, comprising:
a motor including a motor shaft configured to rotate about a shaft rotational axis;

an arbor configured to operatively attach a circular saw blade to the circular saw and to receive a torque from the motor when the motor shaft rotates about the shaft rotational axis;

a switch configured to selectively apply an electric current to the motor;

a switch lever configured to be selectively actuated, by a user of the circular saw by application of an actuation force, to actuate the switch and direct the switch to apply the electric current to the motor;

a lock assembly that includes a switch lock and an arbor lock;

wherein the switch lock:
(i) defines a switch-locked configuration in which the switch lock resists actuation of the switch lever by the user of the circular saw;
(ii) defines a switch-unlocked configuration in which the switch lever is free to be actuated by the user of the circular saw to actuate the switch and thereby to apply the electric current to the motor; and
(iii) includes a switch lock biasing mechanism that urges the switch lock toward the switch-locked configuration; and wherein the arbor lock:
(i) defines an arbor-locked configuration in which the arbor lock resists rotation of the arbor about the shaft rotational axis;
(ii) defines an arbor-unlocked configuration in which the arbor lock permits rotation of the arbor about the shaft rotational axis; and
(iii) includes an arbor lock biasing mechanism that urges the arbor lock toward the arbor-locked configuration;

wherein the switch lock biasing mechanism is at least one of:
(i) spaced apart from the arbor lock biasing mechanism; and
(ii) distinct from the arbor lock biasing mechanism wherein the lock assembly includes an assembly lever configured to selectively actuate the switch lock and the arbor lock, wherein the assembly lever is configured to be selectively transitioned between a blade-change mode orientation and a material-cutting mode orientation, and further wherein:
(i) when the assembly lever is in the blade-change mode orientation, the switch lock is in the switch-locked configuration and the arbor lock is in the arbor-locked configuration; and
(ii) when the assembly lever is in the material-cutting mode orientation, the switch lock is in the switch-unlocked configuration and the arbor lock is in the arbor-unlocked configuration; and wherein the assembly lever includes a plurality of detent positions, including at least a locked lever detent position, which corresponds to the blade-change mode orientation, and an unlocked lever detent position, which corresponds to the material-cutting mode orientation.

* * * * *